(12) United States Patent
Froese et al.

(10) Patent No.: US 11,976,146 B2
(45) Date of Patent: May 7, 2024

(54) LONG-CHAIN BRANCHED ETHYLENE-BASED POLYMERS

(71) Applicant: Dow Global Technologies LLC, Midland, MI (US)

(72) Inventors: Robert D. J. Froese, Midland, MI (US); Keran Lu, Lake Jackson, TX (US); Robert L. Sammler, Midland, MI (US); Cornelis F. J. Den Doelder, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/907,467

(22) PCT Filed: Mar. 26, 2021

(86) PCT No.: PCT/US2021/024373
§ 371 (c)(1),
(2) Date: Sep. 27, 2022

(87) PCT Pub. No.: WO2021/195505
PCT Pub. Date: Sep. 30, 2021

(65) Prior Publication Data
US 2023/0125442 A1  Apr. 27, 2023

Related U.S. Application Data

(60) Provisional application No. 63/000,949, filed on Mar. 27, 2020.

(51) Int. Cl.
*C08F 210/18* (2006.01)
(52) U.S. Cl.
CPC .................. *C08F 210/18* (2013.01)

(58) Field of Classification Search
CPC .................................................... C08F 210/18
(Continued)

(56) References Cited

U.S. PATENT DOCUMENTS

| | | |
|---|---|---|
| 4,314,912 A | 2/1982 | Lowery, Jr. et al. |
| 4,547,475 A | 10/1985 | Glass et al. |

(Continued)

FOREIGN PATENT DOCUMENTS

| | | | |
|---|---|---|---|
| EP | 2883890 A1 * | 6/2015 | ............ C08F 210/18 |
| EP | 2883890 A1 | 6/2015 | |

(Continued)

OTHER PUBLICATIONS

International Search Report and Written Opinion dated Aug. 6, 2021, pertaining to International Patent Application No. PCT/US2021/024369, 10 pgs.

(Continued)

*Primary Examiner* — Michael M. Bernshteyn
(74) *Attorney, Agent, or Firm* — Dinsmore & Shohl LLP

(57) ABSTRACT

Embodiments of this disclosure are directed to ethylene-based polymers. The ethylene-based polymer are polymerized units derived from ethylene, diene, and optionally, one or more C3-C12 α-olefins. The ethylene-based polymer includes a melt viscosity ratio (V0.1/V100) at 190 C greater than 20. The V0.1 is the viscosity of the ethylene-based polymer at 190 C at a frequency of 0.1 radians/second, and the V100 is the viscosity of the ethylene-based polymer at 190 C at a frequency of 100 radians/second. Additionally, the ethylene-based polymer includes an average g greater than 0.86, where the average g' is an intrinsic viscosity ratio determined by gel permeation chromatography using a triple detector.

19 Claims, 15 Drawing Sheets

Free chain

—— backbone MW

—— + ----- absolute MW

H2: hydrogenolysis

M: Metal

(58) Field of Classification Search
USPC .......................................................... 526/279
See application file for complete search history.

(56) References Cited

U.S. PATENT DOCUMENTS

| | | | |
|---|---|---|---|
| 4,612,300 | A | 9/1986 | Coleman, III |
| 5,272,236 | A | 12/1993 | Lai et al. |
| 5,278,272 | A | 1/1994 | Lai et al. |
| 6,812,289 | B2 | 11/2004 | Van Dun et al. |
| 6,869,904 | B2 | 3/2005 | Boussie et al. |
| 7,030,256 | B2 | 4/2006 | Boussie et al. |
| 8,058,373 | B2 | 11/2011 | Stevens et al. |
| 8,101,696 | B2 | 1/2012 | Konze et al. |
| 9,029,487 | B2 | 5/2015 | Klosin et al. |
| 2007/0213205 | A1 | 9/2007 | Mihan |
| 2012/0116034 | A1 | 5/2012 | Oswald et al. |
| 2022/0033546 | A1 | 2/2022 | Arriola et al. |
| 2022/0033547 | A1 | 2/2022 | Kashyap et al. |
| 2022/0033548 | A1 | 2/2022 | Froese et al. |

FOREIGN PATENT DOCUMENTS

| | | | | |
|---|---|---|---|---|
| JP | H0713825 | A | 1/1995 | |
| WO | 1993008221 | A2 | 4/1993 | |
| WO | WO-9308221 | A2 * | 4/1993 | ........... B29C 48/022 |
| WO | 2010027728 | A1 | 3/2010 | |
| WO | 2019099116 | A1 | 5/2019 | |
| WO | 2020069362 | A1 | 4/2020 | |
| WO | 2020069364 | A1 | 4/2020 | |
| WO | 2020069365 | A1 | 4/2020 | |
| WO | 2020069370 | A1 | 4/2020 | |
| WO | WO-2020069364 | A1 * | 4/2020 | .............. C08F 10/02 |
| WO | 2020205585 | A1 | 10/2020 | |

OTHER PUBLICATIONS

International Search Report and Written Opinion dated Jul. 28, 2021, pertaining to International Patent Application No. PCT/US2021/024373, 9 pgs.
International Search Report and Written Opinion dated Aug. 6, 2021, pertaining to International Patent Application No. PCT/US2021/024368, 12 pgs.
International Search Report and Written Opinion dated Jul. 28, 2021, pertaining to International Patent Application No. PCT/US2021/024372, 14 pgs.
Dullaert et al. "Quantitative Assessment of the Branching Architecture of EPDM with High Content of 5-Vinyl-2-Norbornene as Third Monomer", Rubber Chemistry and Technology, vol. 86, No. 4, pp. 503-520 (2013).
Guzman et al. "Simple Model to Predict Gel Formation in Olefin-Diene Copolymerizations Catalyzed by Constrained-Geometry Complexes", AIChE Journal, May 2010, vol. 56, No. 5, 9 pgs.
Zimm et al. "The Dimensions of Chain Molecules Containing Branches and Rings", J. Chem. Phys. 17, 1301 (1949).
Zimm "Apparatus and Methods for Measurement and Interpretation of the Angular Variation of Light Scattering; Preliminary Results on Polystyrene Solutions" J. Chem. Phys. 16, 1099 (1948).
Kratochvil "Fundamental Light-Scattering Methods", Elsevier, Oxford, NY (1987), Chapter 3, 32 pgs.
Figueroa et al. "Synthesis of Imino-Enamido Hafnium and Zirconium Complexes—A New Family of Very Efficient Olefin Polymerization Catalysts", Organometallics 2011, 30, 1695-1709.
Froese et al. "Imino-Amido Hf and Zr Complexes—Synthesis, Isomerization and Olefin Polymerization", Organometallics 2011, 30, 251-262.
Williams et al. "The Construction of a polyethylene calibration curve for gel permeation chromatography using polystyrene fractions", Journal of Polymer Science Part B: Polymer Letters, vol. 6, pp. 621-624 (1968).
Bond "C-H . . . p interactions in the low-temperature crystal structures of a,w-unsaturated linear hydrocarbons", Chem. Commun., 2002, 1664-1665.
Balke et al. "A Strategy for Interpreting Multidetector Size-Exclusion Chromatography Data II", Applications in Plastic Waste Recovery, Chapter 13, 1992, 11 pgs.
Mourey et al. "A Strategy for Interpreting Mulidetector Size-Exclusion Chromatography Data I", Development of a Systematic Approach, Chapter 12, 1992, 11 pgs.
Communication pursuant to Rules 161(1) and 162 EPC, dated Nov. 4, 2022, pertaining to European Patent Application No. 21719793.8 3 pages.
Communication pursuant to Rules 161(1) and 162 EPC, dated Nov. 4, 2022, pertaining to European Patent Application No. 21719794.6 3 pages.
Communication pursuant to Rules 161(1) and 162 EPC, dated Nov. 4, 2022, pertaining to European Patent Application No. 21721665.4 3 pages.
Chinese Office Action dated Oct. 24, 2023, pertaining to CN Patent Application No. 202180022582.1, 10 pgs.
Chinese Office Action dated Nov. 1, 2023, pertaining to CN Patent Application No. 202180021394.7, 12 pgs.
Chinese Office Action dated Nov. 30, 2023, pertaining to CN Patent Application No. 202180023226.1, 14 pgs.
Chinese Office Action dated Nov. 30, 2023, pertaining to CN Patent Application No. 202180023473.1, 14 pgs.

* cited by examiner

LONG-CHAIN BRANCHED ETHYLENE-BASED POLYMERS

CROSS REFERENCE TO RELATED APPLICATIONS

This application is a national stage entry of PCT/US2021/024373 filed on Mar. 26, 2021, which claims priority to U.S. Provisional Patent Application No. 63/000,949 filed on Mar. 27, 2020, the entire disclosures of which are hereby incorporated by reference.

TECHNICAL FIELD

Embodiments of the present disclosure generally relate to polymer compositions having long-chain branches and the process by which the ethylene-based polymer compositions are synthesized.

BACKGROUND

Ethylene-based polymers, such as polyethylene polymers, are produced via various catalyst systems. Selection of such catalyst systems used in the polymerization process of the ethylene-based polymers is an important factor contributing to the characteristics and properties of such ethylene-based polymers.

Ethylene-based polymers are manufactured for a wide variety of articles. The polymerization process can be varied in a number of respects to produce a wide variety of resultant polymer resins having different physical properties that render the various resins suitable for use in different applications. The effect of branching on properties of ethylene-based polymers depends on the length and the amount of branches. For example, short-chain branching affects the physical properties of that ethylene-based polymer. Short branches mainly influence the mechanical and thermal properties. As short-chain branching frequency increases, the polymer is less able to form lamellar crystals, and the mechanical and thermal properties diminish. Small amounts of long-chain branching can alter the polymer processing properties significantly.

To form long-chain branching (LCB), a vinyl or terminal double bond of a polymer chain is incorporated into a new polymer chain. Reincorporation of vinyl terminated polymers and introducing a diene comonomer are two mechanisms by which a vinyl group on a polymer strand is incorporated into a second polymer strand. Additionally, long-chain branching is induced via radicals. It is difficult to control the amount of branching in all three mechanisms. When using radicals or dienes to initiate long-chain branching, the branching may become too numerous, thereby causing gelling and reactor fouling. The reincorporation mechanism does not produce much branching, and branching can only occur after the polymer strand is produced, thereby further limiting the amount of branching that can occur.

An increased amount of long-chain branching (LCB) provides an increase in melt processing properties. Long-chain branched material (e.g., low density polyethylene, LDPE) is added to LLDPE as a processing aid. In general, LDPE has good processing properties but films made from it have poor physical properties such as tear or dart strength. Films made from linear low density polyethylene (LLDPE) have good physical properties such as tear or dart strength but cannot be effectively processed. Blending of some amount of LDPE is required for processing (melt strength, shear thinning) but these reduce the physical properties of LLDPE films. When blending LLDPE and LDPE, researchers are balancing processability and physical properties, while never achieving ideal values for both.

SUMMARY

Ongoing needs exist to produce a polymer composition having a high melt strength and normal to low viscosity as indicated by the melt index, which provides better processability yet allow the polymers to be formed without fouling in a reactor. Thus, the process and ethylene-based polymers of this disclosure seek to form long-chain branching without causing the ethylene-based polymer to gel or foul reactors.

Embodiments of this disclosure are directed to ethylene-based polymers. The ethylene-based polymer are polymerized units derived from ethylene, diene, and optionally, one or more $C_3$-$C_{12}$ α-olefins. The ethylene-based polymer includes a melt viscosity ratio ($V_{0.1}/V_{100}$) at 190° C. greater than 20. The $V_{0.1}$ is the viscosity of the ethylene-based polymer at 190° C. at a frequency of 0.1 radians/second, and the $V_{100}$ is the viscosity of the ethylene-based polymer at 190° C. at a frequency of 100 radians/second. Additionally, the ethylene-based polymer includes an average g' greater than 0.86, where the average g' is an intrinsic viscosity ratio determined by gel permeation chromatography using a triple detector.

In some embodiments of this disclosure, the ethylene-based polymer are polymerized units derived from ethylene, diene, and one or more $C_3$-$C_{12}$ α-olefins. The ethylene-based polymer includes a melt strength greater than 10 cN (Rheotens device, 190° C., 2.4 mm/s$^2$, 120 mm from the die exit to the center of the wheels, extrusion rate of 38.2 s$^{-1}$, capillary die of 30 mm length, 2 mm diameter and 180° entrance angle). Additionally, ethylene-based polymer includes an average g' greater than 0.86. The average g' is an intrinsic viscosity ratio determined by gel permeation chromatography using a triple detector.

DETAILED DESCRIPTION

Figure 1:
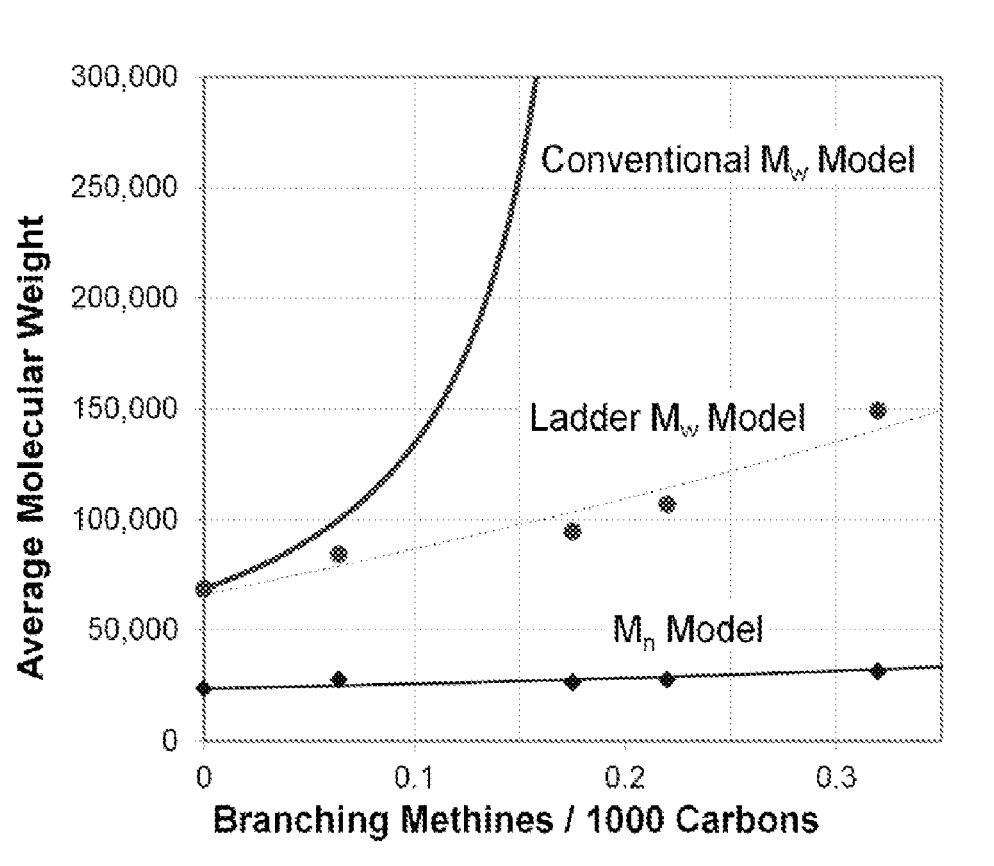
FIG. 1 is a graphical depiction of the molecular weight of a polymer as the number of branching methines per 1000 carbons increase.
Figure 2:
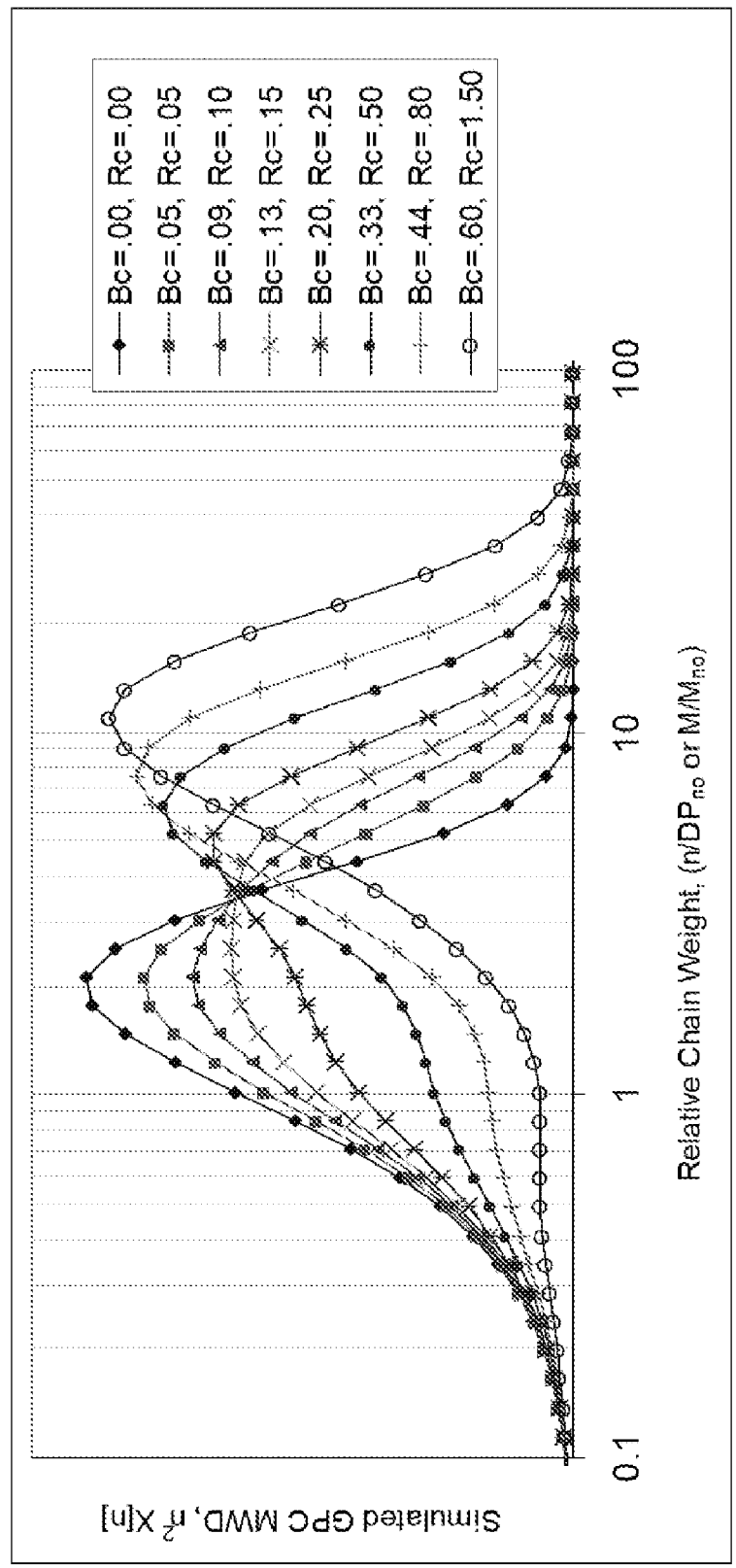
FIG. 2 is a graphical model predicted dependence of the molecular weight distribution (MWD) curve on branching level.

Specific embodiments of a process for synthesizing polymer and polymers synthesized by the process of this disclosure will now be described. It should be understood that the process for synthesizing polymers of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Definitions

As used herein, "multimodal" means compositions that can be characterized by having at least two (2) polymer fractions with varying densities and weight averaged molecular weights, and optionally, may also have different melt index values. In one embodiment, multimodal may be defined by having at least two distinct peaks in a Gel Permeation Chromatography (GPC) chromatogram showing the molecular weight distribution. Specifically, in the present embodiments, the GPC measurements are computed via absolute GPC. In another embodiment, multimodal may be defined by having at least three distinct peaks in a Crystallization Elution Fractionation (CEF) chromatogram showing the short chain branching distribution. Multimodal includes resins having three peaks as well as resins having more than three peaks.

The term "bimodal polymer" means a multimodal ethylene-based polymer having two primary fractions: a first ethylene-based polymer fraction, which may be a low molecular weight fraction, and a second ethylene-based polymer fraction, which may be a high molecular weight fraction.

The term "trimodal polymer" means a multimodal ethylene-based polymer having three primary fractions: a first ethylene-based polymer fraction, a second ethylene-based polymer fraction, and a third ethylene-based polymer fraction.

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers. The term "bimodal polymer" refers to two polymers formed, each from a different catalyst.

"Polyethylene" or "ethylene-based polymer" shall mean polymers comprising greater than 50 mol % of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "diene" refers to a monomer or molecule having two alkenes (double bonds).

Embodiments of this disclosure include a process of synthesizing long-chain branched polymers by adding ethylene, at least one diene, optionally at least one $C_3$-$C_{12}$ α-olefin comonomer in the presence of at least one multi-chain catalyst, at least one single-chain catalyst, and optionally, a solvent, in which the multi-chain catalyst includes a molecule having a plurality of polymerization sites.

The process of synthesizing polymers according to this disclosure is different from the conventional long-chain branching. The term "long-chain branching" refers to branches having greater than 100 carbon atoms. A "branch" refers to a portion of polymer that extends from a tertiary or quaternary site. When the branch extends from a tertiary site, there are two other branches, which collectively could be the polymer strand from which the branch extends. Conventionally, long-chain branching (LCB) may occur naturally in the polymerization process, as shown in Scheme 1. This can occur through vinyl termination of the polymer chain and reinsertion of the macromolecular vinyl, thereby, creating a tri-functional long-chain branch. Depending on the degree of branching, a variety of methods can either determine LCB, such as nuclear magnetic resonance (NMR), or distinguish the effect of LCB in the polymer. For example, the effect of LCB is observed in shear flow in the van Gurp-Palmen analysis, also an increase of the shear viscosity at low angular frequencies and the increased degree of the shear thinning behavior can be attributed to LCB. In extensional flow, the influence of LCB is usually identified in the degree of hardening (strain hardening) or the strength of the melt (melt strength) and the maximum deformation achieved. A high level of natural LCB in a polymer, a polymer with a g' value of less than 0.5, is difficult to achieve due to the limited concentration of vinyl-terminated polymers (maximum one per polymer chain) and the need to run to high ethylene conversion to ensure LCB formation. To enable a greater amount of vinyl-terminated polymers to be reinserted in a second polymer chain ensure there is a low level of ethylene concentration in the reactor.

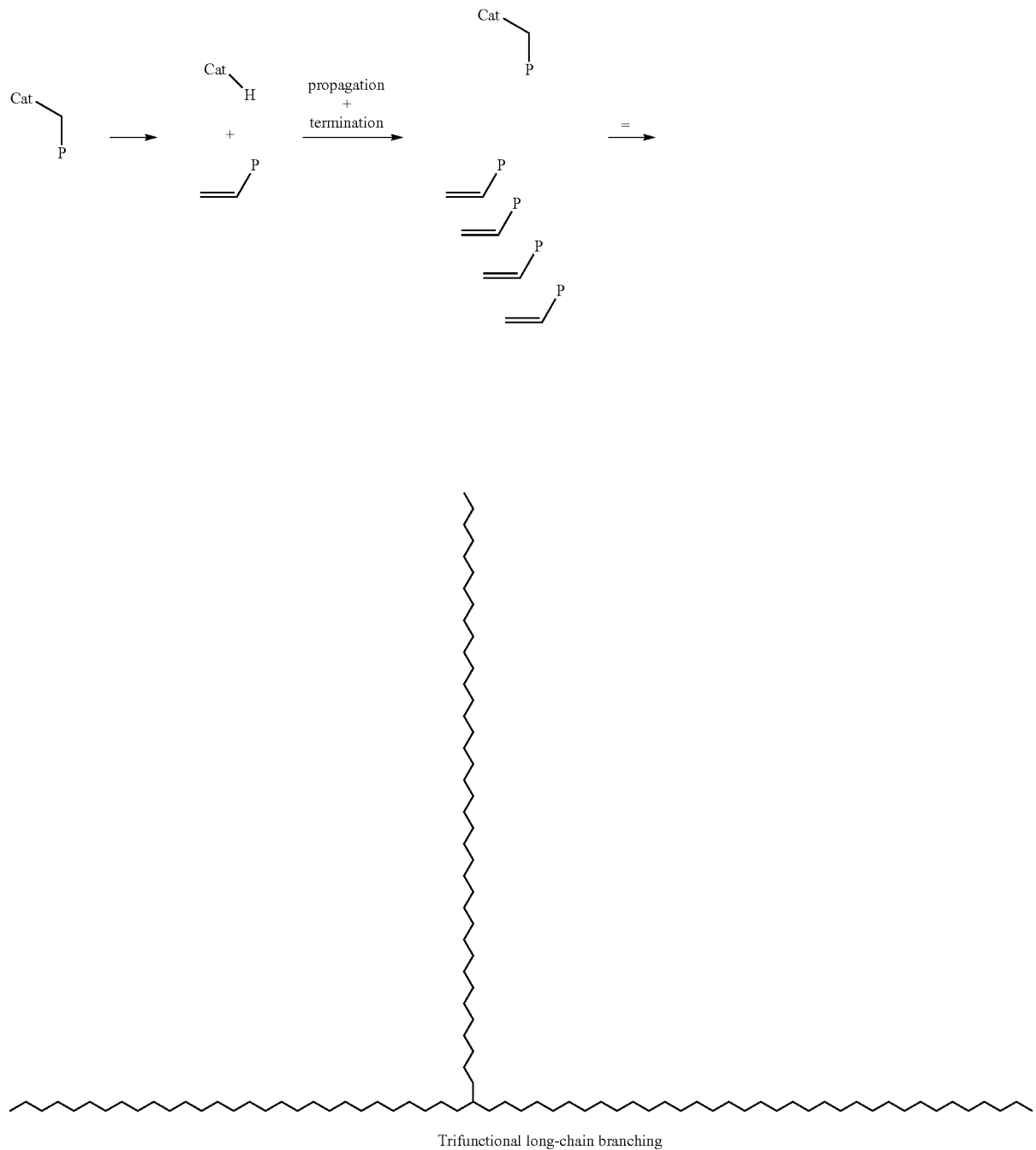

Scheme 1: Naturally occuring long-chain branching: Chain transfer event leading to vinyl terminated polymers Trifunctional long-chain branching In Scheme 1, "Cat" is the catalyst and "P" is the polymer chain.

There is minimal long-chain branching that forms through the naturally occurring branching. One way to enhance naturally occurring LCB is through the addition of α,ω-dienes to the polymerization system, whether it be in a radical, heterogeneous, or homogeneous process. In general, dienes add to the polymer chain in a similar manner to α-olefins, but leave a pendant vinyl group, which can insert into a polymer chain a second time to create the LCB, as illustrated by Scheme 2. In general, the diene length does not matter, only that it can link two polymer chains together. In principle, the concentration of pendant vinyls can be controlled through the amount of diene added to the reactor. Thus, the degree of LCB can be controlled by the concentration of pendant vinyls.

Scheme 2: Long-Chain Branching via Diene Incorporation

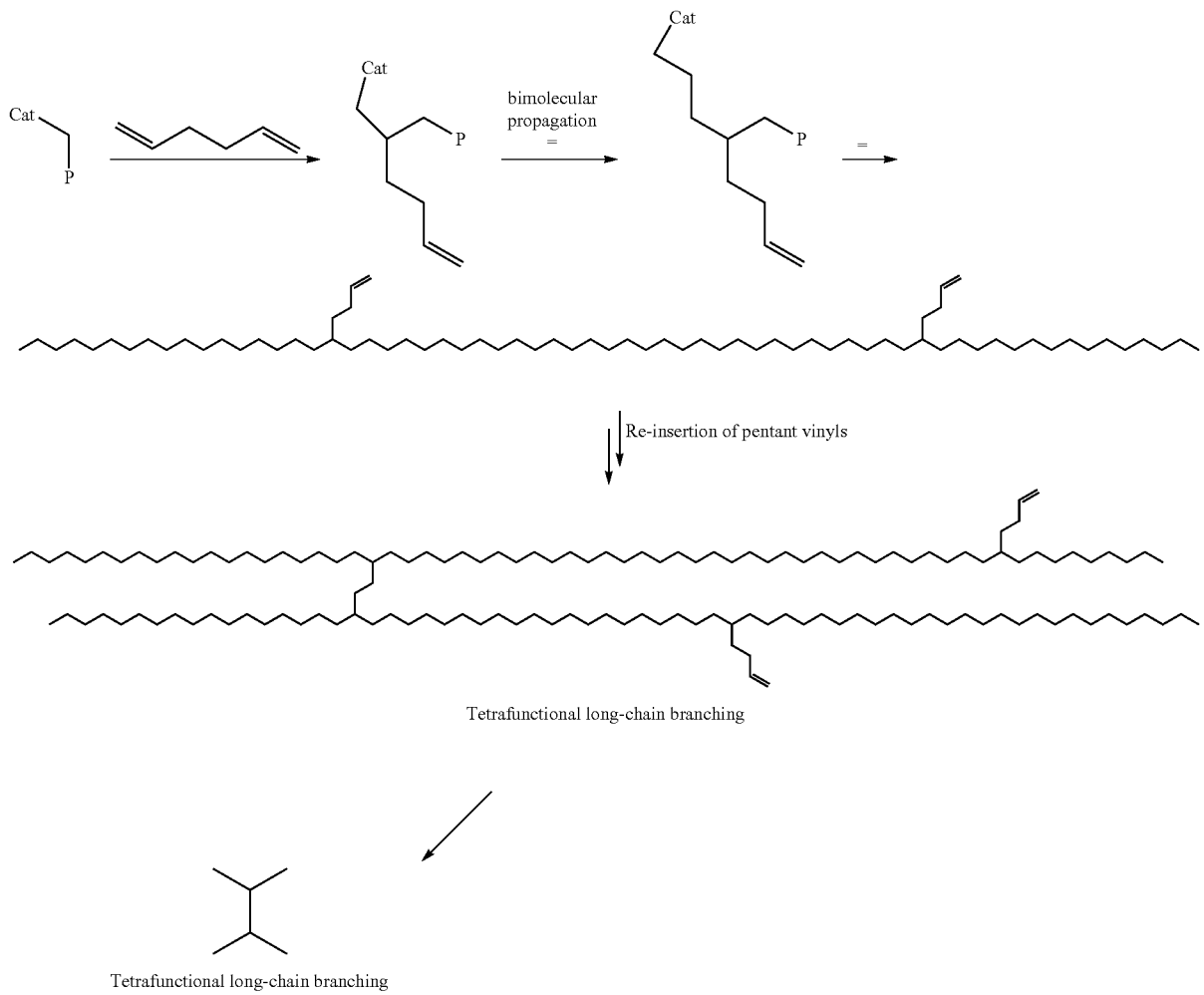

Tetrafunctional long-chain branching

In Scheme 2, "Cat" is the catalyst; "P" is the polymer chain; and the diene in this example is 1,5-hexadiene.

The conventional process of incorporating dienes into a polymer synthesis system suffers from the fundamental flaw of gel formation or reactor fouling. The kinetic modeling, described previously {Guzman-2010 (J. D. Guzman, D. J. Arriola, T. Karjala, J. Gaubert, B. W. S. Kolthammer, *AIChE* 2010, 56, 1325), Application Nos. PCTUS2019/053524, filed Sep. 27, 2019; PCTUS2019/053527, filed Sep. 27, 2019; PCTUS2019/053529, filed Sep. 27, 2019; and PCTUS2019/053537, filed Sep. 27, 2019}, may provide good predictive results that enable a better understanding into gel formation. For example, longer polymer chains have more inserted olefins, thus more inserted dienes, thus more pendant vinyls, implying that longer polymer chains will be more likely to re-insert into the catalyst to form an LCB. Thus, the longer polymer chains preferentially re-insert forming tetra-functional long-chain branches, which are even larger polymer molecules, and a gel problem results. As indicated in Scheme 2, a tetra-functional LCB has a short segment (number of carbons between the two double bonds of the diene), which bridges two long chains on each side of the short segment. A simulation of the weight average molecular weight ($M_w$) and number average molecular weight ($M_n$) as a function of branching is shown in FIG. 1 for polyethylene in a semi-batch reactor at constant pressure. In FIG. 1, $M_n$ only marginally increases as $M_w$ becomes infinite. As $M_w$ increases to a number greater than 200,000 grams per mole (g/mol), the polymer gels, gelling occurs, or reactor fouling is present.

The term "gel" or "gelling" refers to a solid composed of at least two components: the first is a three dimensional cross-linked polymer and the second is a medium in which the polymer does not fully dissolve. When the polymer gels and does not fully dissolve, the reactor may become fouled with polymer gel.

The term "Ladder Branched" polymer refers to the tetra-functional long-chain branched polymer as disclosed in this application, and the term "Ladder Branching mechanism" refers to how the "Ladder Branched" polymers are formed.

In one or more embodiments of this disclosure, the process to synthesize the long-chain branched polymer achieves long-chain branching and avoids gel formation or reactor fouling. Without intending to be bound by theory, it is believed that reactor fouling is avoided by reacting the two alkenes of the diene in a concerted fashion across two proximal polymer chains. For example and illustrated by Scheme 3, one alkene of the diene reacts before the second alkene, and the second alkene reacts before too many ethylene molecules are added to the polymer strand, thereby removing the close proximity the second alkene has to the reactive site. The reaction of the first alkene of the diene into one polymer and second alkene of the diene into an adjacent polymer chain before many ethylene monomers are inserted is referred to as a concerted addition of the diene into proximal polymer chains.

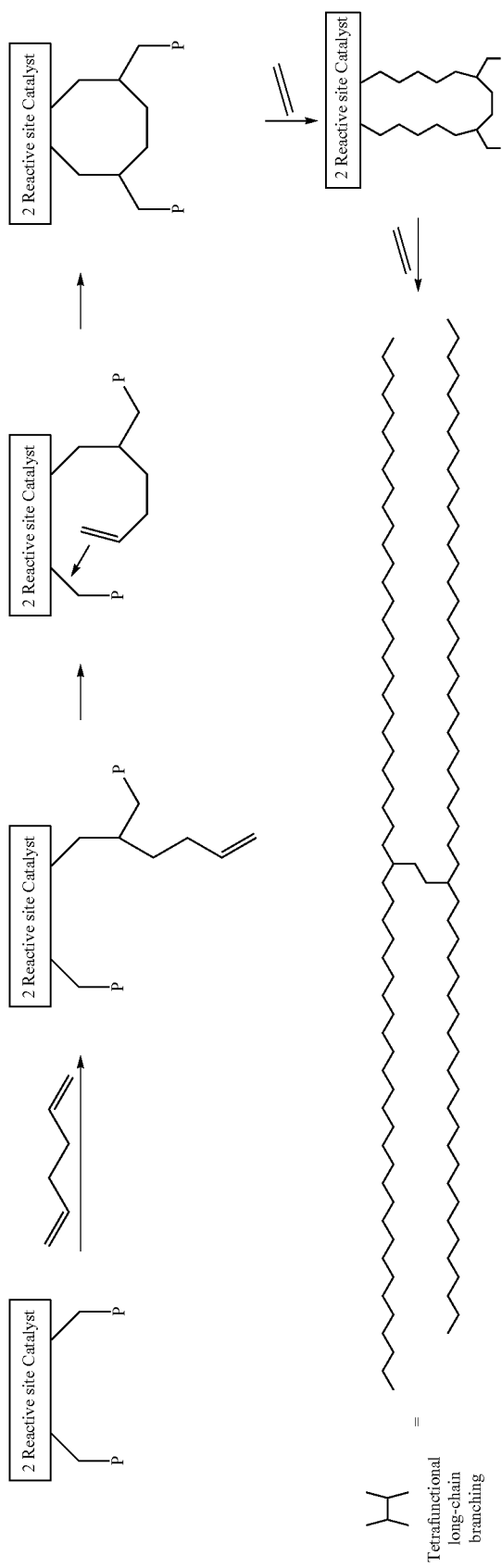
Scheme 3: Depiction of incorporating the diene in a concerted fashion (P is a polymer chain), also called the "Ladder Branching" mechanism.
= Tetrafunctional long-chain branching Polymer strands are linear segments of a polymer, or more specifically a copolymer, which are optionally joined at the end(s) by branching junctures. For example, a tetra-functional branch juncture joins the ends of four polymer strands, as opposed to a tri-functional branch juncture, which joins the ends of three polymer strands as shown in Scheme 1.

The combination of a multi-chain catalyst and diene influences the amount and type of branching. Embodiments of the present disclosure are directed to controlling polymer properties such as: 1) the use of multiple diene species, 2) the use of a multi-chain catalyst and another catalyst species, or 3) the combination of polymerization environments including multiple reactors zones or a gradient of zones.

The use of multiple catalysts, including single-chain catalysts, may allow some conventional long-chain branching. The use of multiple dienes species also includes those dienes, which do not create Ladder branches or tend to result in "conventional" LCB. The process of synthesizing polymers according to this disclosure is different from the conventional long-chain branching.

In one or more embodiments, the process for polymerizing the long-chain branched polymer includes a catalyst with at least two active sites in close proximity (multi-chain catalysts). In order for the two active sites to be in close proximity, the two active sites may be less than 18.5 angstroms (Å) apart. In some embodiments, the two active sites include a distance of from 2.5 angstroms (Å) to 18.5 Å, from 9 Å to 14 Å, or approximately 11 Å. In various embodiments, the process for polymerizing the long-chain branched polymer includes a multi-chain catalyst. In one or more embodiments, the multi-chain catalyst may include at least one metal center, in which the two active site are on the same metal center. In some embodiments, the multi-chain catalyst may include a metal-ligand complex, in which the two active sites (two polymer chains) are on the same metal center.

In one or more embodiments, the diene is an unconjugated diene, wherein the unconjugated diene is acyclic. In some embodiments, the diene is an α,ω-diene, which means that both of the double bonds are terminal. In other embodiments, the unconjugated diene includes a branched group, wherein the branched group is a $C_1$-$C_4$ alkyl. The branched group may occur on the $sp^2$ hybridized carbon atom, such as 2-methyl-1,4-pentadiene, or the $sp^3$ hybridized carbon atom of the diene, such as 3-methyl-1,4-pentadiene. In various embodiments, the diene is chosen from 1,4-pentadiene, 1,5-hexadiene, 1,6-heptadiene, 1,7-octadiene, 1,8-nonadiene, 1,9-decadiene, 1,10-undecadiene, 1,11-dodecadiene, dimethyldivinylsilane, dimethyldiallylsilane, dimethylallylvinylsilane.

According to an X-ray crystal structure (A. D. Bond, Chem. Comm. 2002, 1664), 1,9-decadiene has a distance between terminal carbons of 10.8 Å. While there is data that the 1,9-decadiene form rungs between two polymer chains via the "Ladder Branching" mechanism, one may believe that linear α,ω-dienes having more than 10 carbon atoms may also form rungs via the "Ladder Branching" mechanism. Without intent to be bound by theory, the issue of whether α,ω-dienes having more than 10 carbon atoms may form rungs may be determined by the distance between the two polymer chains. For example, when the two polymer chains reside on different metal atoms of a catalyst (e.g., bimetallic, heterogeneous), the α,ω-dienes may include additional methylene units (same C—C bond lengths and angles) to extend this structure to 1,15-hexadecadiene. Without intent to be bound by theory, it is presumed this 16-carbon analog still has the potential to form a rung via the "Ladder Branching" mechanism. In this manner, one can consider dienes, 1,11-dodecadiene (13.3 Å distance between terminal carbons), 1,13-tetradecadiene (15.9 Å distance between terminal carbons), 1,15-hexadecadiene (18.5 Å distance between terminal carbons). In some embodiments, when the dual chain catalyst in the "Ladder Branching" mechanism is a bimetallic catalysts, the diene is less than or equal to 18.5 Å.

It is well-known that modern computational techniques can reproduce known experimental crystal structures to high accuracy as a way to estimate distances between chains for a catalyst. For a heterogeneous system, one may estimate surface concentration of metals, which are often measured in metal atoms per nanometer squared ($M/nm^2$). This surface coverage provides an estimate of accessible metals on the surface which if evenly dispersed may be converted to an M-M distance, which reflects the distance between the polymer chains. For an extended surface, 1 metal/$nm^2$ leads to a distance of 10 Å between the metal atoms, well within the desired cut-off. At 18.5 Å, one can determine the coverage at 0.3 metal/$nm^2$.

Examples of catalysts having at least two active sites, wherein the active sites are in close proximity include, but are not limited to, bimetallic transition metal catalysts; heterogeneous catalysts; dianionic activators with two associated active catalysts; a ligated transition metal catalyst with more than one propagating polymer chain; a group IV olefin polymerization catalyst including monoanionic groups, bidentate monoanionic groups, tridentate monoanionic groups, or a monodentate, bidentate, or tridentate monoanionic groups with external donors.

The catalysts in Table 1 are illustrative embodiments of the classes of catalysts previously described and specific catalysts contemplated. The examples in Table 1 are not intended to be limiting; rather they are merely illustrative and specific examples for the classes of catalyst previously mentioned.

TABLE 1

Catalysts with more than one active site in close proximity

| Class | Illustrative | Specific |
|---|---|---|
| Bimetallic Catalysts | | |

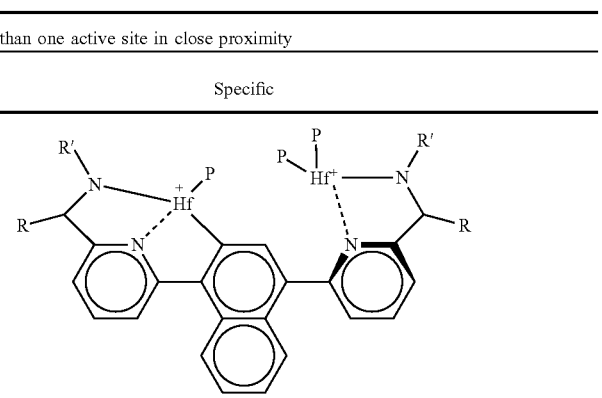

TABLE 1-continued

Catalysts with more than one active site in close proximity

| Class | Illustrative | Specific |
|---|---|---|
| | 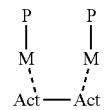 Dianionic Activator associated with two active catalyst | 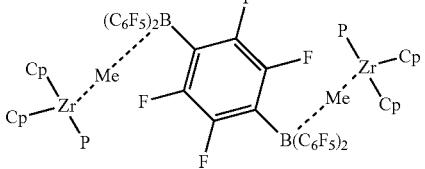 |
| Heterogeneous and Supported Catalysts | 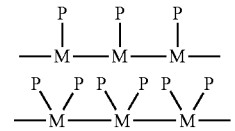 Heterogeneous Catalyst | |
| Group IV Olefin Polymerization Catalyst | 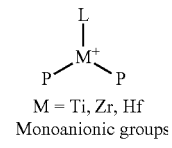 M = Ti, Zr, Hf Monoanionic groups | 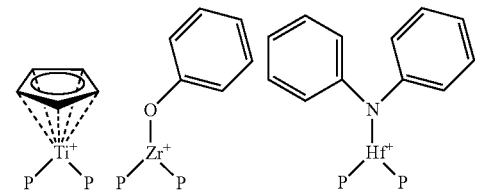 |
| | 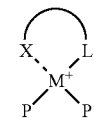 Bidentate monoanionic groups | 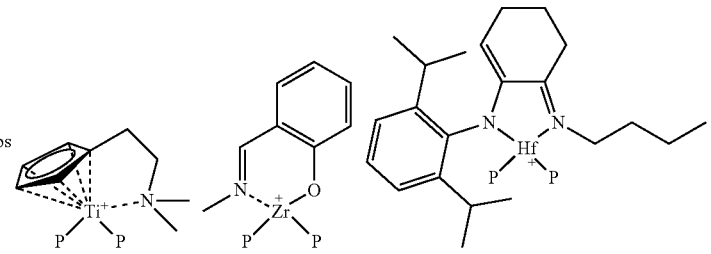 |

While not intending to be bound by theory, a mechanism, as explained in this section, describes how a multi-chain catalyst can create a unique bridged molecular architecture when polymerizing diene co-monomers under desired conditions. A pictorial description of the kinetics is shown in Scheme 4, in which the catalyst center produces two polymer strands. Scheme 4 shows how a combination of diene bridging and chain transfer may create a diene "Ladder Branched" polymer structure. The term "Ladder Branched" polymer refers to the long-chain branching, in which a short chain or rung that includes one to twelve carbon atoms links two long-chains together. As shown, the metal-ligand catalyst having at least two polymer chain sites propagates two separate polymer chains. One alkene of the diene is incorporated into one of the sites of the catalyst, and it is believed that due to the close proximity of the propagation sites, the second alkene of the diene is then quickly incorporated into the second polymer chain, thereby forming a bridge or rung. This successive addition of diene is referred to as a "concerted" addition of the diene, distinguishing it from catalysts without two proximal chains where diene addition leads to a concentration of vinyl containing polymers in the reactor, which react at a later time. The term "rung" refers to the diene once it is incorporated into two separate polymer strands, thereby linking the strands together. The first and second polymer strands continue to propagate until the polymer transfers to another catalyst, the polymer is released from the catalyst, the catalyst dies, or another diene is added.

Scheme 4: Illustration of "Ladder Branching" kinetics including the resulting molecular architecture. The metal-ligand catalyst are represented together by L—M⁺.

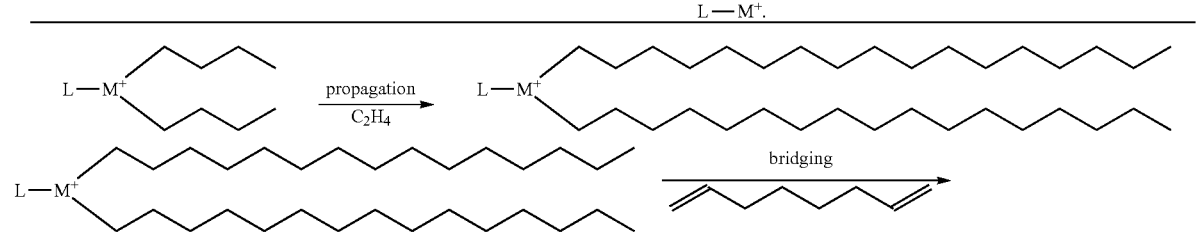

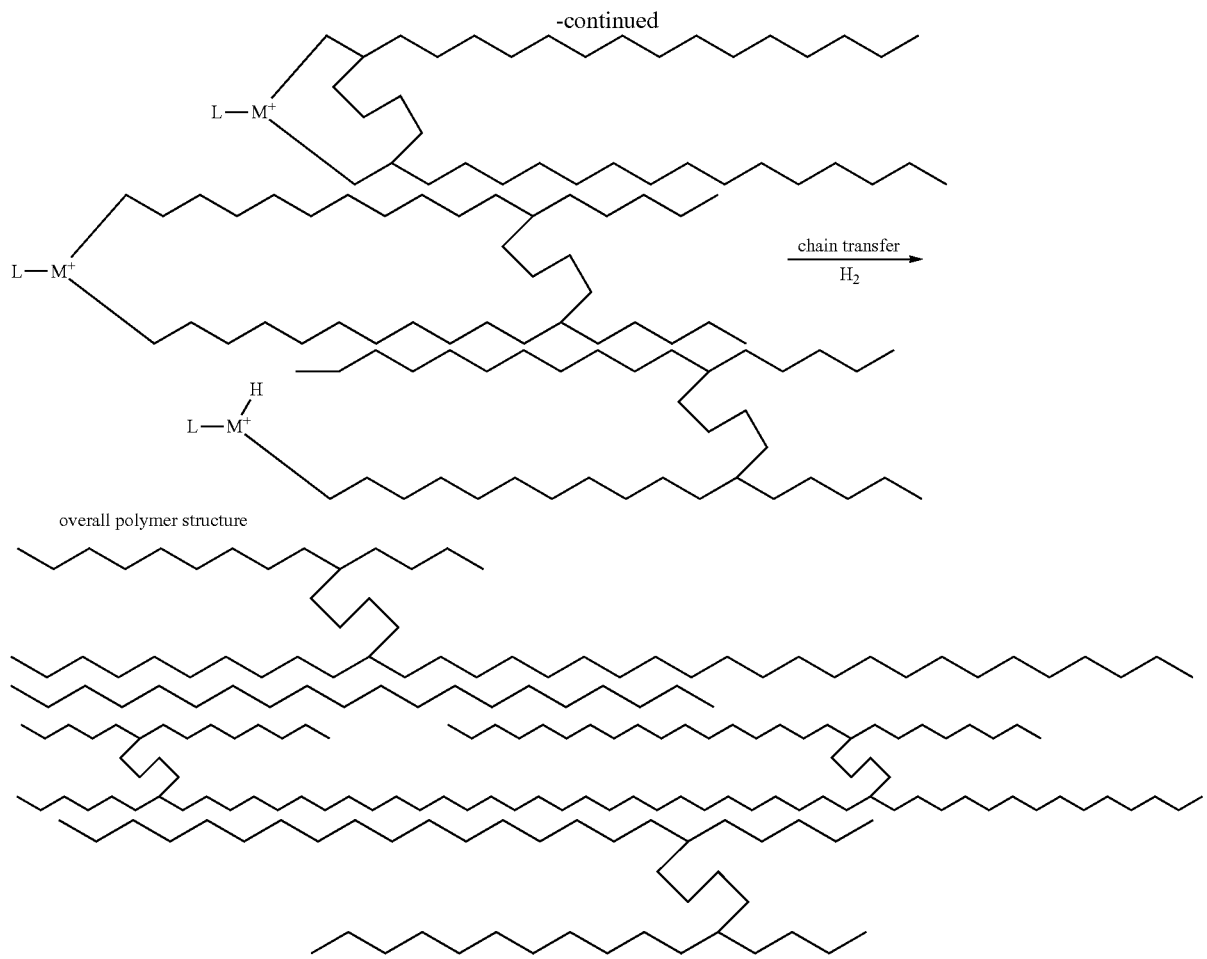

overall polymer structure

In one or more embodiments, the single-site catalyst may include, but is not limited to, a Ziegler-Natta catalyst, a chromium catalyst, a metallocene catalyst, a post-metallocene catalyst, a constrained geometry complex (CGC) catalyst, a phosphinimine catalyst, or a bis(phenylphenoxy) catalyst. Details and examples of CGC catalysts are provided in U.S. Pat. Nos. 5,272,236; 5,278,272; 6,812,289; and WO Publication 93/08221, which are all incorporated herein by reference in their entirety. Details and examples of bis(phenylphenoxy) catalysts are provided in U.S. Pat. Nos. 6,869,904; 7,030,256; 8,101,696; 8,058,373; 9,029,487, which are all incorporated herein by reference in their entirety.

The bis(phenylphenoxy) catalyst is an example of a homogeneous catalyst. Other examples of homogeneous catalysts include constrained geometry catalysts. Examples of heterogeneous catalysts may include heterogeneous Ziegler-Natta catalysts. Examples of such Ziegler-Natta catalysts are those derived from organomagnesium compounds, alkyl halides or aluminum halides or hydrogen chloride, and a transition metal compound. Examples of such catalysts are described in U.S. Pat. No. 4,314,912 (Lowery, Jr. et al.), U.S. Pat. No. 4,547,475 (Glass et al.), and 4,612,300 (Coleman, III), the teachings of which are incorporated herein by reference.

Catalyst Systems

Specific embodiments of catalyst systems that can, in one or more embodiments, be used to produce the multimodal ethylene-based copolymer compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl ($—C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom ($—H$) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "$—H$" means a hydrogen or hydrogen radical that is covalently bonded to another atom. "Hydrogen" and "$—H$" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., $—CH_2—$) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. $—CH_2CH_2—$), propan-1,3-diyl (i.e. $—CH_2CH_2CH_2—$), 2-methylpropan-1,3-diyl (i.e. $—CH_2CH(CH_3)CH_2—$). Some examples of $(C_6-050)$ arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted $—CH_2CH_2—$, $—(CH_2)_3—$, $—(CH_2)_4—$, $—(CH_2)_5—$, $—(CH_2)_6—$, $—(CH_2)_7—$, $—(CH_2)_5—$, $—CH_2C^*HCH_3$, and $—(CH_2)_4C^*(H)(CH_3)$, in which "$C^*$" denotes a carbon atom from which a hydrogen atom is removed to form a secondary or tertiary alkyl radical. Examples of substituted $(C_1-C_{50})$alkylene are substituted $(C_1-C_{20})$alkylene, $—CF_2—$, $—C(O)—$, and $—(CH_2)_{14}C(CH_3)_2(CH_2)_5—$ (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo[2.2.2]octane.

The term "($C_3$-$C_{40}$)cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$, each $R^N$, and each $R^P$ is unsubstituted ($C_1$-Cis)hydrocarbyl or —H. The term "heterohydrocarbon" refers to a molecule or molecular framework in which one or more carbon atoms are replaced with a heteroatom. The term "($C_1$-$C_{40}$)heterohydrocarbyl" means a heterohydrocarbon radical of from 1 to 40 carbon atoms and the term "($C_1$-$C_{40}$)heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each ($C_1$-050)heterohydrocarbyl and ($C_1$-$C^{50}$)heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The ($C_1$-$C_{40}$)heterohydrocarbyl may be unsubstituted or substituted ($C_1$-$C_{40}$)heteroalkyl, ($C_1$-$C_{40}$)hydrocarbyl-O—, ($C_1$-$C_{40}$)hydrocarbyl-S—, ($C_1$-$C_{40}$)hydrocarbyl-S(O)—, ($C_1$-$C_{40}$)hydrocarbyl-S(O)$_2$—, ($C_1$-$C_{40}$)hydrocarbyl-Si($R^C$)$_2$—, ($C_1$-$C_{40}$)hydrocarbyl-N($R^N$)—, ($C_1$-$C_{40}$)hydrocarbyl-P($R^P$)—, ($C_2$-$C_{40}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{40}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_4$-$C_{40}$)heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., ($C_x$-$C_y$)heteroaryl generally, such as ($C_4$-$C_{12}$)heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing ($C_1$-$C_{50}$) carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or substituted by one or more $R^S$.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F$^-$), chloride (Cl$^-$), bromide (Br$^-$), or iodide (I$^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, the single-chain catalyst in the process for polymerizing ethylene-based polymers include a metal-ligand complex according to formula (I):

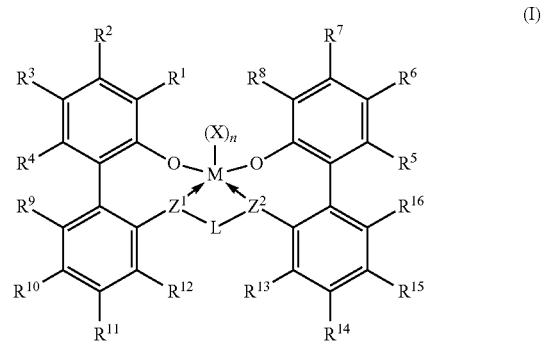

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

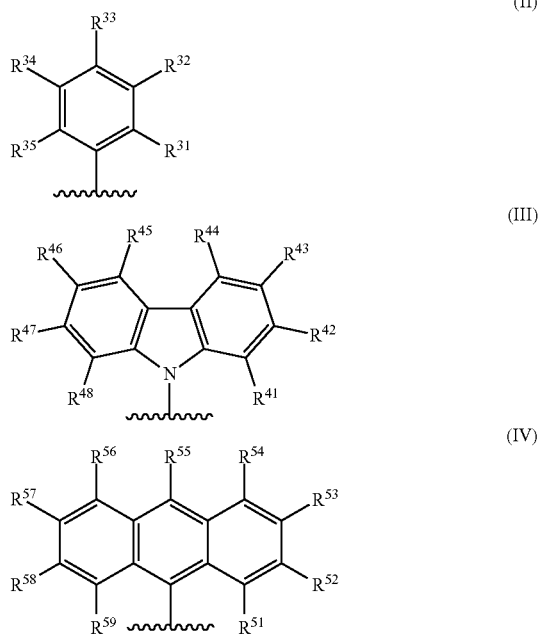

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, halogen, and —H.

An illustrative example of a metal-ligand complex according to formula (I) is Catalyst 4:

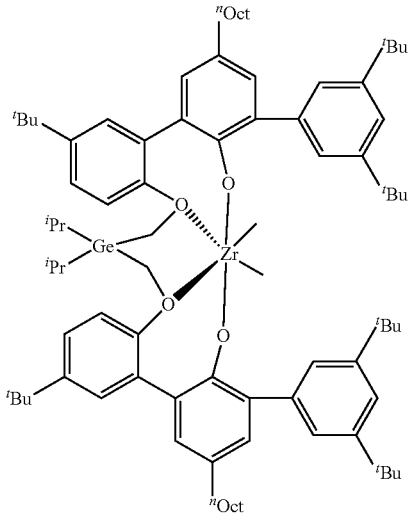

In one or more embodiments, the single-chain catalyst includes a metal-ligand complex according to formula (V):

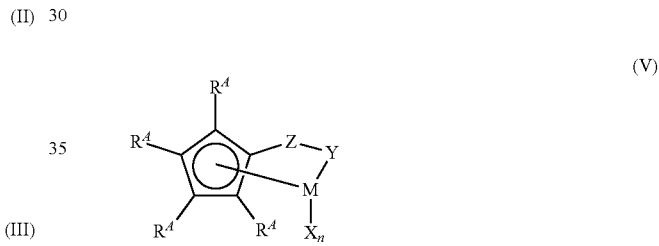

In formula (V), M is hafnium, zirconium, titanium, a Group III or Lanthanide metal. Each $R^A$ is independently selected from the group consisting of ($C_1$-$C_{40}$)hydrocarbyl; ($C_1$-$C_{40}$)heterohydrocarbyl, —Si($R^B$)$_3$; —Ge($R^B$)$_3$, —P($R^B$)$_2$, —N($R^B$)$_2$, —O$R^B$, —S$R^B$, —NO$_2$, —CN, CF$_3$, $R^B$S(O)—, $R^B$S(O)$_2$—; ($R^B$)$_2$C=N—, $R^B$C(O)O—, $R^B$OC(O)—, $R^B$C(O)N(R)—, ($R^B$)$_2$NC(O)—, halogen atom, and hydrogen atom. Optionally, two or more $R^A$ groups can combine together into one or more ring structures. Each $R^B$ is independently ($C_1$-$C_{30}$)hydrocarbyl or ($C_1$-$C_{30}$)heterohydrocarbyl.

In formula (V), Z is [($R^D$)$_n$G]$_m$, wherein subscript m is 1 or 2; each G is independently selected from carbon, silicon, germanium or boron; provided that and when G is carbon, silicon, or germanium, n is 2; and when G is boron, n is 1. Each $R^D$ is independently ($C_1$-$C_{30}$)hydrocarbyl or ($C_1$-$C_{30}$)heterohydrocarbyl.

In formula (V), Y is selected from the group consisting of —O—, —S—, —NR$^E$—, and —PR$^E$—; each $R^B$, $R^D$, or $R^E$ independently is ($C_1$-$C_{30}$)hydrocarbyl or ($C_1$-$C_{30}$)heterohydrocarbyl.

In formula (V), each X is ($C_1$-$C_{40}$)hydrocarbon, ($C_1$-$C_{40}$)heterohydrocarbon, ($C_1$-$C_{40}$)hydrocarbyl; ($C_1$-$C_{40}$)heterohydrocarbyl; Si(—Si($R^C$)$_3$; —Ge($R^C$)$_3$, —P($R^C$)$_2$, —N($R^C$)$_2$, —O$R^C$, —S$R^C$, —NO$_2$, —CN, CF$_3$, $R^C$S(O)—, $R^C$S(O)$_2$—; ($R^C$)$_2$C=N—, $R^C$C(O)O—, $R^C$OC(O)—, $R^C$C (O)N(R)—, $(R^C)_2$NC(O)—, halogen atom, and hydrogen atom. Each $R^C$ independently is $(C_1$-$C_{30})$hydrocarbyl or $(C_1$-$C_{30})$heterohydrocarbyl.

An illustrative example of a metal-ligand complex according to formula (V) is Catalyst 2:

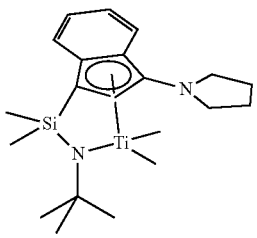

In one or more embodiments, the single-chain catalyst includes a metal-ligand complex according to formula (VI):

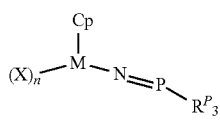

(VI)

In formula (VI), M is hafnium, zirconium, titanium, a Group III or Lanthanide metal. Each X is $(C_1$-$C_{40})$hydrocarbon, $(C_1$-$C_{40})$heterohydrocarbon, $(C_1$-$C_{40})$hydrocarbyl; $(C_1$-$C_{40})$heterohydrocarbyl; Si(—Si$(R^C)_3$, Ge$(R^C)_3$, P$(R^C)_2$, N$(R^C)_2$, OR$^C$, —SR$^C$, —NO$_2$, —CN, CF$_3$, $R^C$S(O)—, $R^C$S(O)$_2$—; $(R^C)_2$C=N—, $R^C$C(O)O—, $R^C$OC(O)—, $R^C$C(O)N(R)—, $(R^C)_2$NC(O)—, halogen atom, and hydrogen atom. Each $R^C$ independently is $(C_1$-$C_{30})$hydrocarbyl or $(C_1$-$C_{30})$heterohydrocarbyl. Each $R^P$ independently is $(C_1$-$C_{30})$hydrocarbyl or $(C_1$-$C_{30})$heterohydrocarbyl. Subscript n of $(X)_n$ is 1 or 2. Cp is a cyclopentadienyl that may be unsubstituted or substituted by up to five substituents. Each of the five substituents may be $(C_1$-$C_8)$hydrocarbyl, $(C_1$-$C_8)$heterohydrocarbyl, or halogen. Optionally, two of the five substituents may combine together to form a ring.

In some embodiments, Cp is selected from cyclopentadienyl, indenyl, and fluorenyl.

In formula (VI), N is nitrogen, P is phosphorous, and each $R^P$ is independently $(C_1$-$C_{30})$hydrocarbyl.

An illustrative example of a metal-ligand complex according to formula (VI) is Catalyst 3:

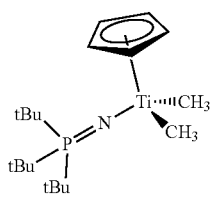

In embodiments, the multi-chain catalyst includes a metal-ligand complex according to formula (VII):

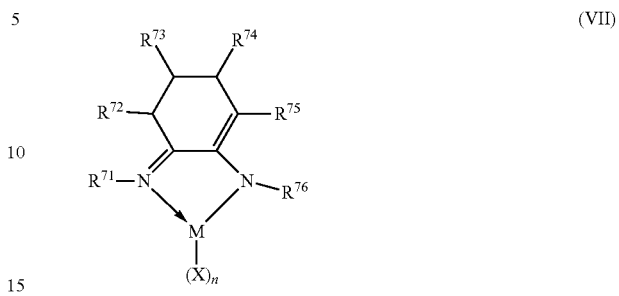

(VII)

In formula (VII), M is hafnium, zirconium, titanium, a Group III or Lanthanide metal. Each X is $(C_1$-$C_{40})$hydrocarbon, $(C_1$-$C_{40})$heterohydrocarbon, $(C_1$-$C_{40})$hydrocarbyl; $(C_1$-$C_{40})$heterohydrocarbyl; Si(—Si$(R^C)_3$; —Ge$(R^C)_3$, —P$(R^C)_2$, —N$(R^C)_2$, —OR$^C$, —SR$^C$, —NO$_2$, —CN, CF$_3$, $R^C$S(O)—, $R^C$S(O)$_2$—; $(R^C)_2$C=N, $R^C$C(O)O—, $R^C$OC(O)—, $R^C$C(O)N(R)—, $(R^C)_2$NC(O)—, halogen atom, and hydrogen atom. Each $R^C$ independently is $(C_1$-$C_{30})$hydrocarbyl or $(C_1$-$C_{30})$heterohydrocarbyl.

In formula (VII), $R^{71}$ to $R^{76}$ is $(C_1$-$C_{40})$hydrocarbyl; $(C_1$-$C_{40})$heterohydrocarbyl.

An illustrative example of a metal-ligand complex according to formula (VII) is Catalyst 1:

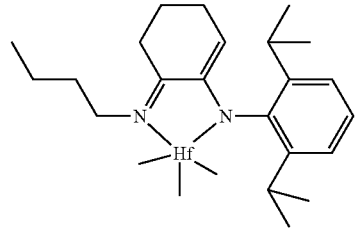

In the catalyst systems according to embodiments of this disclosure, the molar ratio of the bimetallic activator complex to Group IV metal-ligand complex may be from 1:10,000 to 1000:1, such as, for example, from 1:5000 to 100:1, from 1:100 to 100:1 from 1:10 to 10:1, from 1:5 to 1:1, or from 1.25:1 to 1:1. The catalyst systems may include combinations of one or more bimetallic activator complex described in this disclosure.

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum or tri(($C_1$-$C_{20}$)hydrocarbyl)-boron compounds. In embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl) ammonium tetra ($C_1$-$C_{20}$)hydrocarbyl)borane (e.g. bis(octadecyl)methylammonium tetrakis (pentafluorophenyl)borane). As used herein, the term "ammonium" means a nitrogen cation that is a (($C_1$-$C_{20}$) hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activators (co-catalysts) include mixtures comprising a combination of a tri(($C_1$-$C_4$)alkyl)aluminum and a halogenated tri(($C_6$-$C_{18}$) aryl)boron compound, especially a tris(pentafluorophenyl) borane. Embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex): (tris(pentafluoro-phenylborane): (alumoxane) [e.g., (Group 4 metal-ligand complex):(tris (pentafluoro-phenylborane):(alumoxane)] are from 1:1:1 to 1:10:30, in embodiments, from 1:1:1.5 to 1:5:10

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, non-coordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1$^-$) amine, and combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some embodiments, at least 1:1000; and 10:1 or less, and in some embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Characterizing Tetra-Functional Long-Chain Branched Polyolefin

Depending on the degree of branching, a variety of methods can either determine LCB, such as nuclear magnetic resonance (NMR), or distinguish the effect of LCB in the polymer. For example, the effect of LCB is observed in shear flow in the van Gurp-Palmen analysis, also an increase of the shear viscosity at low angular frequencies and strength of the shear thinning behavior can be attributed to LCB. In extensional flow, the influence of LCB is usually identified in the degree of hardening or the strength of the melt and the maximum deformation achieved. Other plots such as Mark-Houwink-Sakurada plots, broadening molecular weight distributions (MWD), and g' plots provide additional information about LCB. A high level of natural LCB in a polymer is difficult to achieve due to the limited concentration of vinyl-terminated polymers (maximum one per polymer chain) and the need to run to high conversion to ensure LCB formation. To ensure high conversion, there is a low ethylene concentration in the reactor, thus enabling a great amount of vinyl-terminated polymers to be reinserted in a second polymer chain.

The conventional process of incorporating dienes into a polymer synthesis system suffers from the fundamental flaw of gel formation or reactor fouling at high branching levels. Kinetic modeling described previously (Application Nos. PCTUS2019/053524, filed Sep. 27, 2019; PCTUS2019/053527, filed Sep. 27, 2019; PCTUS2019/053529, filed Sep. 27, 2019; and PCTUS2019/053537, filed Sep. 27, 2019), provides good predictive results that enable a better understanding of gel formation. For example, longer polymer chains have proportionally more pendant vinyls and polymer chains containing more pendant vinyls will more likely re-insert into the catalyst to form a LCB. Thus, the larger polymer chains preferentially re-insert forming tetra-functional branches, which are even larger polymer molecules, and a gel problem or instability results when the LCB level reaches a threshold value. A simulation of the weight average molecular weight ($M_w$) and number average molecular weight ($M_n$) as a function of conventional tetra-functional branching is shown in FIG. 1 for ethylene-based polymer in a semi-batch reactor at constant pressure. In FIG. 1, $M_n$ only marginally increases as $M_w$ becomes infinite. In this example, as the $M_w$ increases to a number greater than 200,000 grams per mole (g/mol), the polymer molecular weight distribution (MWD) becomes unstable and gels begin to form. The MWD is defined by the weight average molecular weight, $M_w$, divided by the number average molecular weight, $M_n$, ($M_w/M_n$).

Polymer gels are narrowly defined for the purpose of this disclosure to be a polymer fraction that is phase separated due to its high branching level and/or high molecular weight. Polymer gels can be observed in solution or in the melt and tend to interfere with properties such as optical clarity and film and fiber performance. Polyethylene interpolymer gels can be measured by degree of polymer insolubility in hot xylene. Gels content is often correlated to and therefore estimated from GPC polymer recovery percentage. When polymer gels form, they may deposit within the reactor and result in fouling.

Molecular Weight Effects

Figure 3:
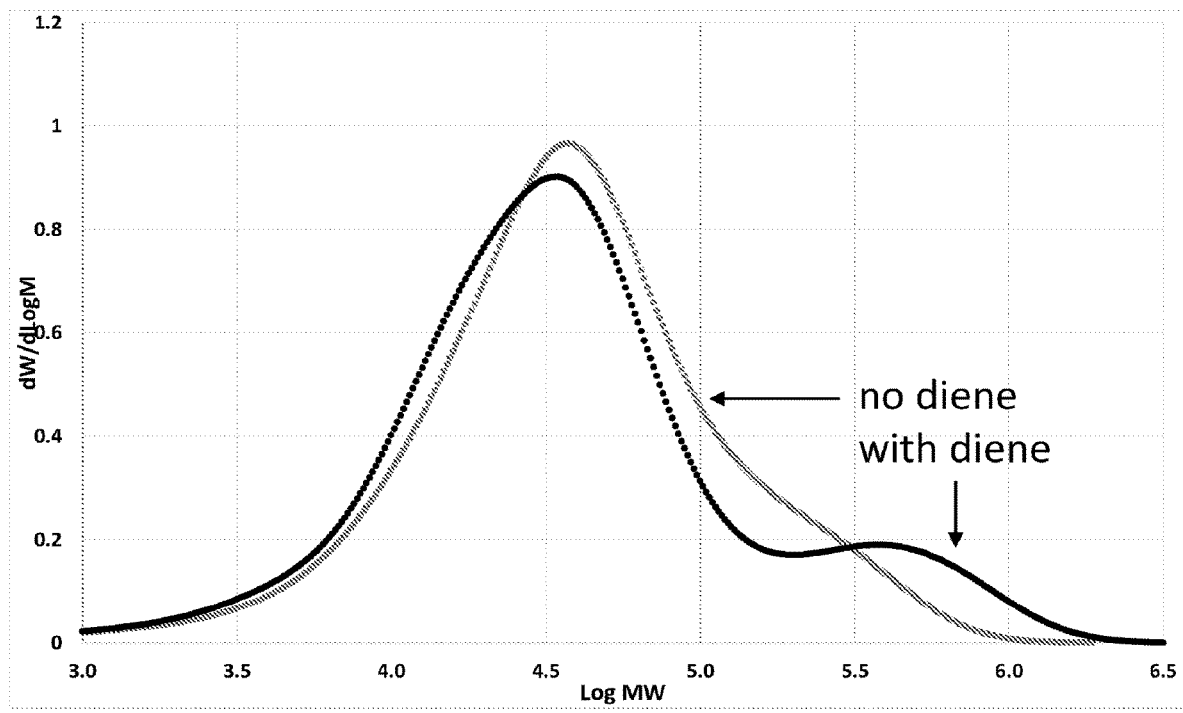
FIG. 3 is a molecular weight distribution (MWD) curve of a two-catalyst bimodal ethylene-based polymer distribution with and without diene.

If two catalysts, e.g., Catalyst 1 and Catalyst 2, are added to a reactor, a bimodal distribution can exist due to the different MWs of the two catalysts. If one of the catalyst is a dual-chain catalyst, that catalyst can effectively Ladder branch the diene. A dual-chain catalyst is an embodiment of a multi-chain catalysts having only two polymerization sites. Because of the efficiency of the diene reaction at the metal center for a dual-chain catalyst (no build-up of vinyls required), the dual-chain catalyst couples polymer chains together efficiently while the single-chain catalyst might not insert enough dienes to form significant LCB or create fouling problems. FIG. 3 shows a MWD of the polymer produced by two catalysts, where a small weight fraction of higher MW polymer is produced by the dual-chain catalyst and appears as a high MW shoulder. Upon addition of the diene, this shoulder goes to much higher MW while the main peak from the single-chain catalyst is essentially unaffected.

Mark-Houwink-Sakurada Analysis

Mark-Houwink-Sakurada plots describe the power-law relationship between the intrinsic viscosity, [η], and absolute molecular weight, M:

$$\eta = \beta M^a \quad (1)$$

In general, [η] follows the radius of gyration or the backbone molecular weight of the polymer. Note there is a difference between the absolute MW (M) and the backbone MW (Mb) in that the absolute MW includes the mass on the side chains, while the backbone MW does not. Utilizing absolute molecular weight, a Mark-Houwink-Sakurada plot of log [η] vs log M leads to:

$$\log(\eta) = \log(\beta) + \alpha \log(M) \quad (2)$$

Note that in this application, logarithms to be base ten are denoted by log.

For linear-chain polymers, a plot of log [η] vs. log M leads to a slope of a and vertical offset of log β. Values for α are known for polyethylene with α=0.73 for typical solvents of trichlorobenzene at 150° C. In many of the evaluations that follow, α=0.73.

When one introduces short-chain branching, deviations from the homopolymer dependence occur. For example at 10 mol % octene, 23% of the total molecular weight exists in side chains, implying that $M_b$=10/13 M:

$$\eta = \beta \left(\frac{10}{13} M\right)^\alpha \quad (3)$$

$$\log(\eta) = \log(\beta) + \alpha \log(M) - \alpha \log(1.3) \quad (4)$$

For α=0.73, α log 1.3=0.083, the Mark-Houwink-Sakurada plot for this polymer will be parallel to the homopolymer (no comonomer) but offset by 0.083 lower on the log scale. The line is parallel to the homopolymer dependence because short-chain branching is evenly distributed along the backbone at all molecular weights.

The effect on the Mark-Houwink-Sakurada plot for long-chain branching is more complicated. Due to significant molecular weight on the side chains (long-chain branches), there is also a decrease in the Mark-Houwink-Sakurada dependence. However, it is not evenly distributed since long-chain branch formation by the conventional diene or the high-pressure (LDPE) process grows dendritically or with branch-on-branch structure; higher molecular weight species have more long-chain branching. These concepts lead to a Mark-Houwink-Sakurada behavior that deviates further from the linear-chain homopolymer dependence as the absolute molecular weight gets larger (see FIG. 4).

In principle, if one can determine a relationship between backbone molecular weight and absolute molecular weight, one can predict the Mark-Houwink-Sakurada plot. However, this is too complicated for the conventional diene and high-pressure processes. Note that the intrinsic viscosities are cut-off at the high MW end once the (dW$_f$/dLog M) signal is less than 0.03.

Figure 5:
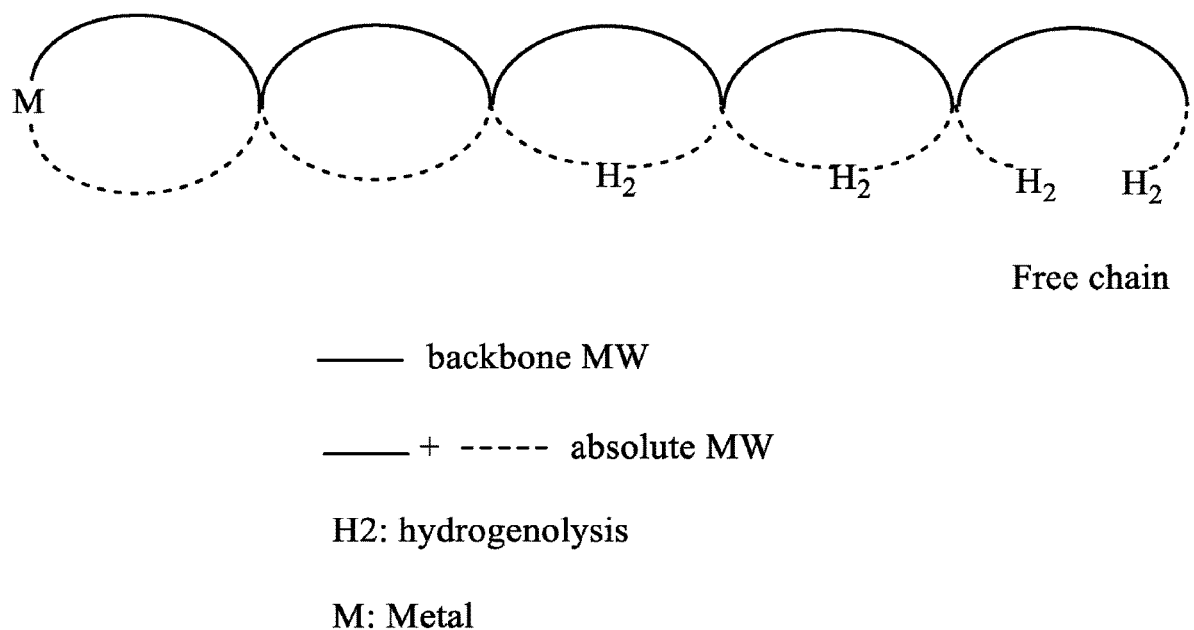
FIG. 5 is an illustration of an ethylene-based ladder polymer, in which the polymer backbone is depicted as solid lines, and the long chain branches are depicted by dotted lines. This illustration provides a visual depiction of the difference in molecular weights calculated by conventional standard verses absolute weight average molecular weight (MW) for the long-chain branched polymers of this disclosure.

The term "Ladder polymer" refers to the high molecular weight fraction of the polyethylene-based polymer, in which the high molecular weight fraction includes tetrafunctional long-chain branching. The Ladder polymer, broken up by hydrogenolyzed segments, has a defined relationship between backbone and absolute molecular weight (see FIG. 5). In FIG. 5, the polymer backbone in shown in black. The dotted lines show the tetrafunctional branching as shown in Scheme 3. The absolute MW cannot exceed twice the backbone MW. In principle, the absolute MW should be close to double the backbone MW depending on the degree of free chains that exist in the Ladder polymer; these free chains result from consecutive hydrogenolysis events on the same polymer chain. The percentage, thus mass, of free chains will be small relative to the overall polymer molecular weight. Using the upper bound value where the backbone MW is half the absolute MW, $M_b$=½ M:

$$\eta = \beta \left(\frac{M}{2}\right)^\alpha \quad (5)$$

$$\log(\eta) = \log(\beta) + \alpha \log(M) - \alpha \log(2) \quad (6)$$

Figure 4:
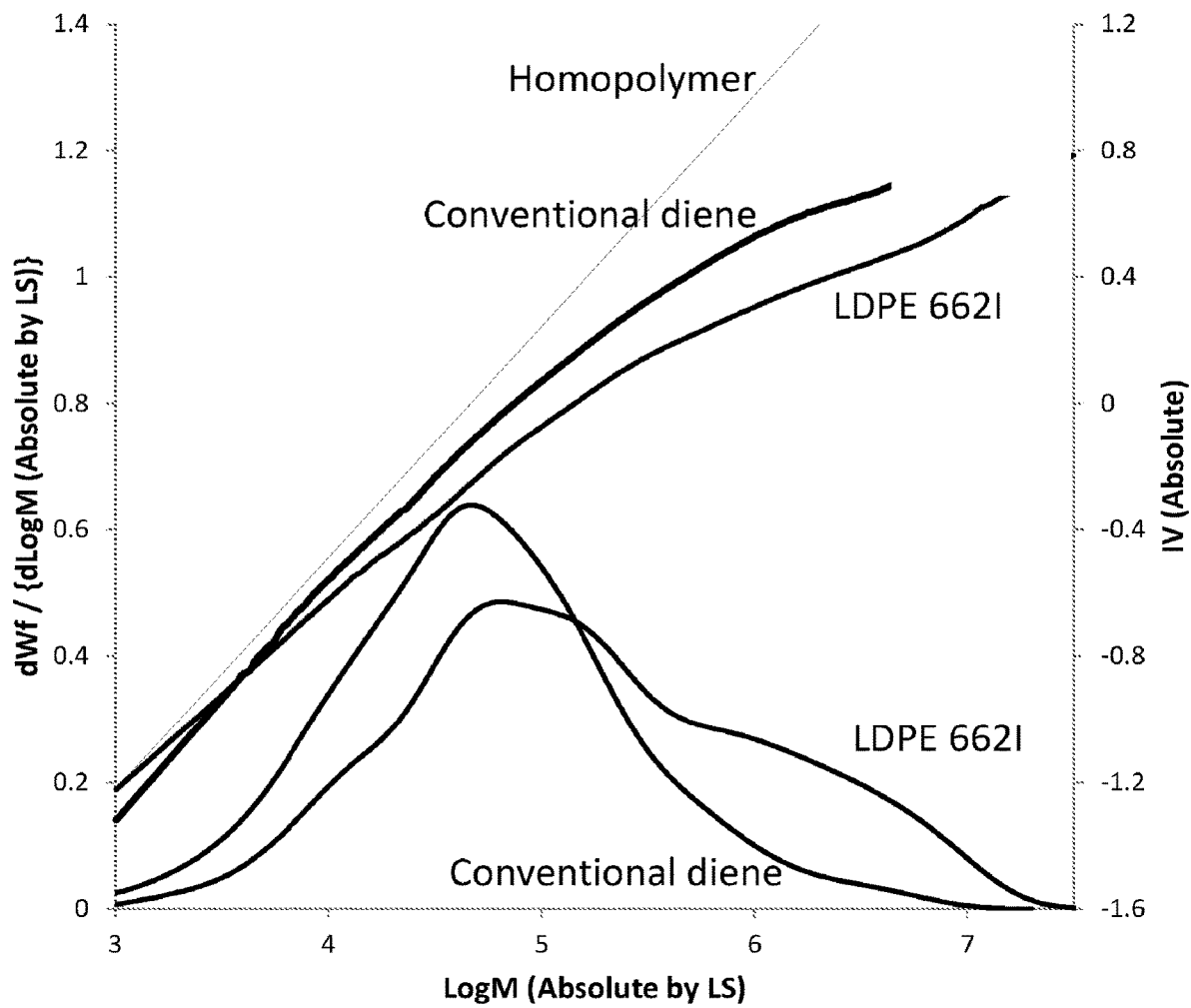
FIG. 4 is a Mark-Houwink-Sakurada plot for a conventionally long-chain branching (LCB) polymer and an LDPE, specifically DOW™ LDPE 6621.

For α=0.73, α log 2=0.220, and the Mark-Houwink-Sakurada plot for this polymer will be depressed much further than a 10 mol % copolymer. While the Ladder Mark-Houwink-Sakurada dependence is reduced further than that of a 10 mol % octene copolymer, it is limited in how far below the homopolymer dependence, unlike LDPE and conventional diene branching (FIG. 4).

Figure 6:
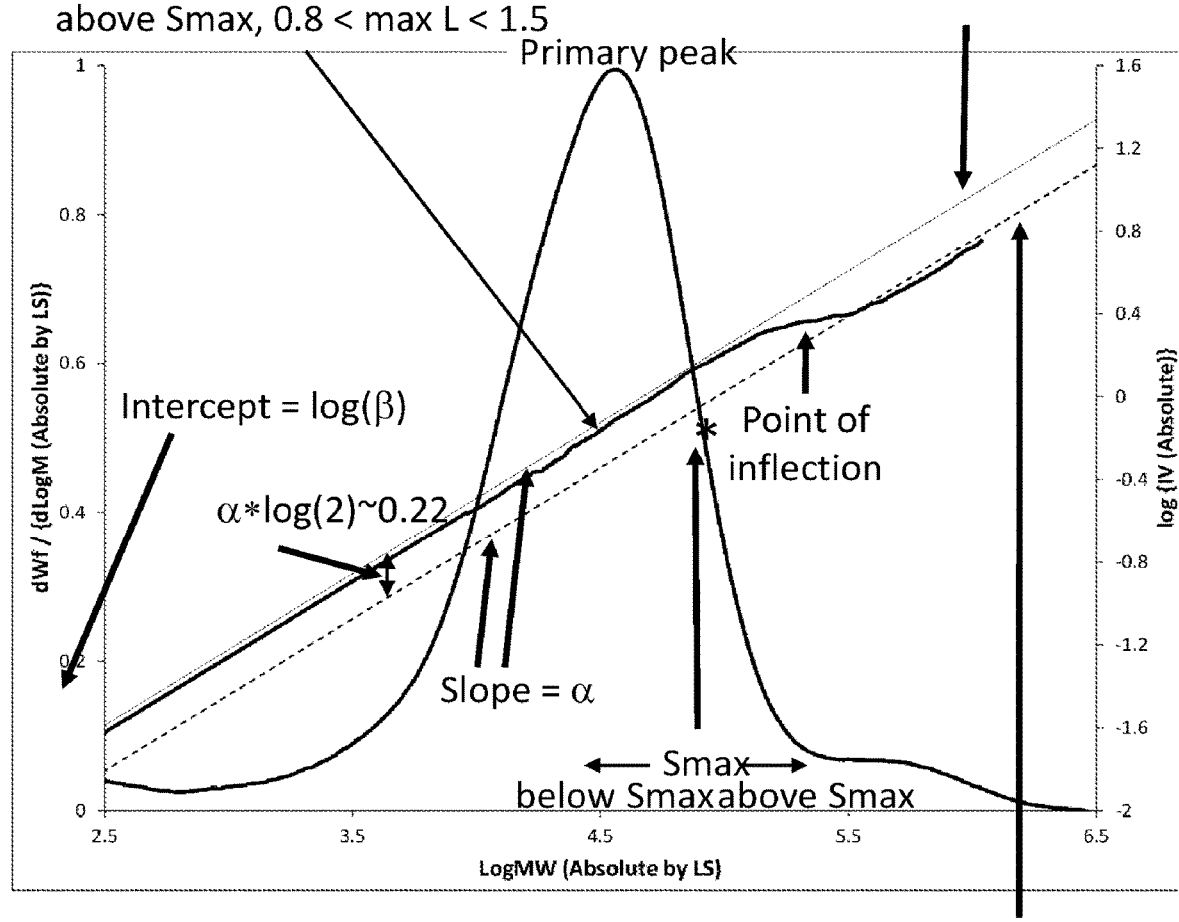
FIG. 6 is a Mark-Houwink-Sakurada plot, which shows the definition of parameters and variables that characterize the long-chain branched polymers of this disclosure in the Mark-Houwink-Sakurada plot.

FIG. 6 depicts the theoretical linear homopolymer power law relationship (Equation 2) and the theoretical Ladder limit (Equation 6). The real data show the transition from linear polymer to Ladder branched polymer.

If we consider the homopolymer (with diene but no octene) in the case of the Ladder polymer, the chains are either linear (Equation 2) or they are long-chain branched (Equation 6). Equation 6 is valid whether there is one LCB (rung) or more than one LCB. The lowest MW polymer chains will contain almost no LCBs while the highest MW polymer chains will usually contain at least one LCB and between these, a transition period where some of the chains are linear and some are Ladder long-chain branched. This transition period must have a point of inflection ($d^2[\eta]/dM^2$=0, and $d^3[\eta]/dM^3$>0) which is shown in FIG. 6.

Figure 7:
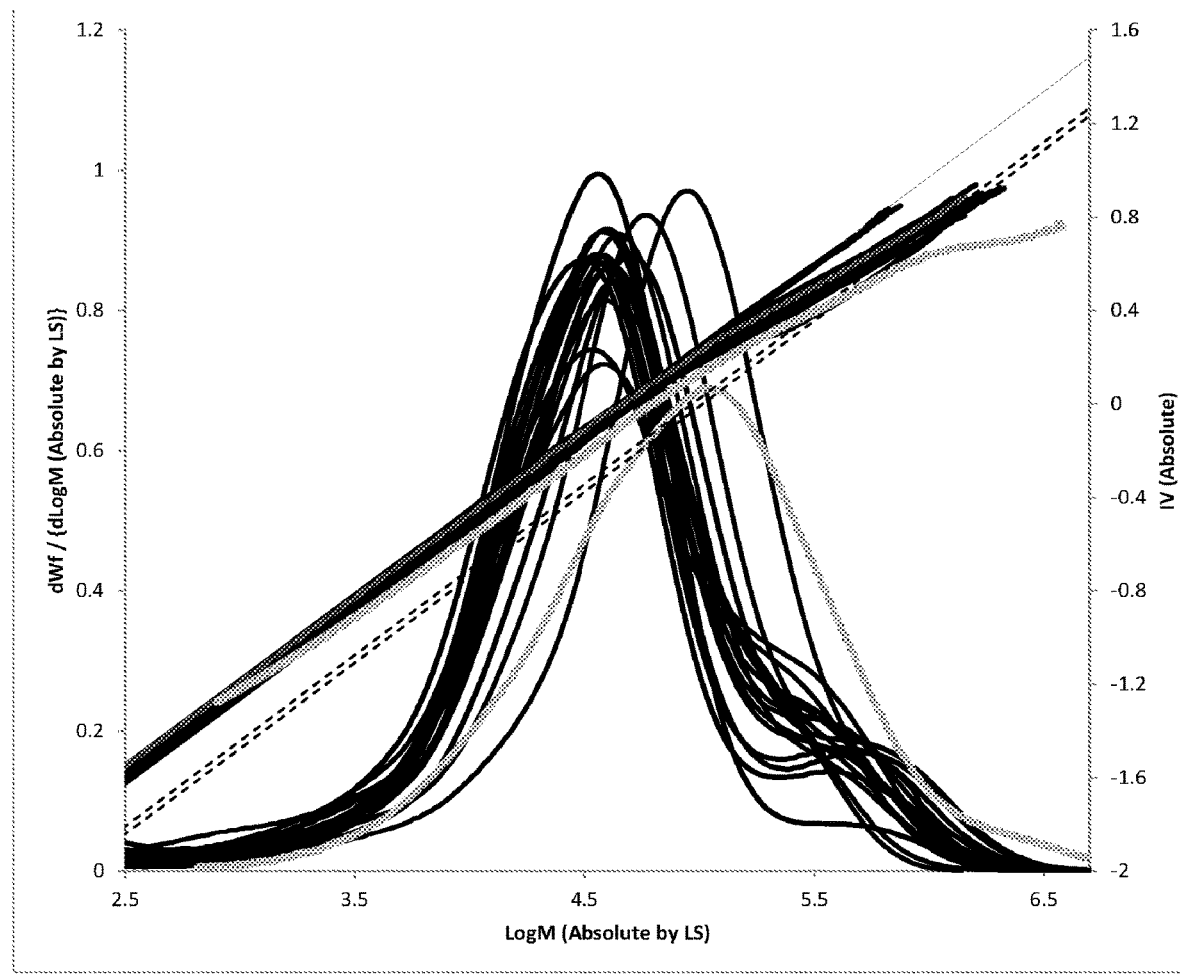
FIG. 7 are Mark-Houwink-Sakurada plots of a series of bimodal ethylene-based polymers where the low MW fraction is produced by a single-chain catalyst and the high MW fraction is produced by the dual-chain catalyst.

Bimodal polymers, where a single-chain catalyst creates a large fraction of lower MW linear-chain polyethylene-based polymer, such that the MW is below S. and a dual-chain catalyst creates a small fraction of higher MW Ladder long-chain branched polyethylene-based polymer, exhibit the expected Mark-Houwink-Sakurada shift (see FIG. 7 for examples based on data in Table 2-Table 10), in which the MW is above $S_{max}$. (The $S_{max}$ values are described in more detail in the proceeding section). The large fraction of lower MW linear-chain polyethylene-based polymer follows Equation 2 while the small fraction of higher MW Ladder long-chain branched polyethylene-based polymer follows Equation 6. Large amounts of the high MW fraction, increase the viscosity, and, thereby, making it difficult to pump it out of a reactor. If the amount of the high MW fraction can be controlled, then the overall viscosity does not reach a point in which reactor fouling occurs and the polymer can be safely removed from the reactor.

In FIG. 6, there is a point of inflection, between linear polymers in the low MW fraction and Ladder branched polymers of the high MW fraction. However, there will also be a point of inflection for short-chain branching since the bimodal distribution comes from two catalysts, each with a different comonomer incorporation level.

The previously presented equations are applicable to cases, in which there is i) no octene in the low MW fraction and no octene in the Ladder polymer, ii) no octene in the low MW fraction and 10 mol % octene in the Ladder polymer, iii) 10 mol % octene in the low MW fraction and no octene in the Ladder polymer, iv) 10 mol % octene in the low MW fraction and 10 mol % octene in the Ladder polymer.

i) no octene in the low MW fraction and no octene in the Ladder polymer:

$$\eta_{low} = \beta M^\alpha \quad (7)$$

$$\log(\eta_{low}) = \log(\beta) + \alpha\log(M) \quad (8)$$

$$\eta_{high} = \beta\left(\frac{M}{2}\right)^\alpha \quad (9)$$

$$\log(\eta_{high}) = \log(\beta) + \alpha\log(M) - \alpha\log(2) \quad (10)$$

The difference between log viscosities for the low and high MW regions respectively, Equations 8-10, is:

$$\log(\eta_{low}) - \log(\eta_{high}) = \alpha \log(2) = 0.220 \quad (11)$$

ii) no octene in the low MW fraction and 10 mol % octene in the Ladder polymer:

$$\log(\eta_{low}) = \log(\beta) + \alpha\log(M) \quad (8)$$

$$\eta_{high} = \beta\left(\frac{M}{2.6}\right)^\alpha \quad (11)$$

$$\log(\eta_{high}) = \log(\beta) + \alpha\log(M) - \alpha\log(2.6) \quad (12)$$

The difference between log viscosities for the low and high MW regions respectively, Equation 8-12, is:

$$\log(\eta_{low}) - \log(\eta_{high}) = \alpha \log(2.6) = 0.303 \quad (13)$$

iii) 10 mol % octene in the low MW fraction and no octene in the Ladder polymer:

$$\eta_{low} = \beta\left(\frac{M}{1.3}\right)^\alpha \quad (14)$$

$$\log(\eta_{low}) = \log(\beta) + \alpha\log(M) - \alpha\log(1.3) \quad (15)$$

$$\log(\eta_{high}) = \log(\beta) + \alpha\log(M) - \alpha\log(2) \quad (10)$$

The difference between log viscosities for the low and high MW regions respectively, Equation 15-10, is:

$$\log(\eta_{low}) - \log(\eta_{high}) = \alpha\log(2) - \alpha\log(1.3) = \alpha\log\left(\frac{2}{1.3}\right) = 0.137 \quad (16)$$

iv) 10 mol % octene in the low MW fraction and 10 mol % octene in the Ladder polymer:

$$\log(\eta_{low}) = \log(\beta) + \alpha \log(M) - \alpha \log(1.3) \quad (15)$$

$$\log(\eta_{high}) = \log(\beta) + \alpha \log(M) - \alpha \log(2.6) \quad (12)$$

The difference between log viscosities for the low and high MW regions respectively, Equation 15-12, is:

$$\log(\eta_{low}) - \log(\eta_{high}) = \alpha \log(2.6) - \alpha \log(1.3) = \alpha \log(2) = 0.220 \quad (17)$$

As a comparative example with no long-chain branching, a bimodal distribution, in which both polymer fractions have the same octene incorporation (e.g., 0 mol % octene or 5 mol % octene or 10 mol % octene), the difference between log viscosities for the low and high MW fraction will be zero. Additionally, a bimodal polymer where there is a difference in comonomer incorporation (no LCB): i) 10 mol % octene in the low MW fraction and no octene in the high MW fraction, ii) no octene in the low MW fraction and 10 mol % octene in the high MW fraction will be:

i) 10 mol % octene in the low MW fraction and no octene in the high MW fraction:

$$\log(\eta_{low}) = \log(\beta) + \alpha \log(M) - \alpha \log(1.3) \quad (15)$$

$$\log(\eta_{high}) = \log(\beta) + \alpha \log(M) \quad (18)$$

The difference between log viscosities for the low and high MW regions respectively, Equation 15-18, is:

$$\log(\eta_{low}) \log(\eta_{high}) = -\alpha \log(1.3) = -0.083 \quad (19)$$

i) no octene in the low MW fraction and 10 mol % octene in the high MW fraction:

$$\log(\eta_{low}) = \log(\beta) + \alpha \log(M) \quad (8)$$

$$\log(\eta_{high}) = \log(\beta) + \alpha \log(M) - \alpha \log(1.3) \quad (20)$$

The difference between log viscosities for the low and high MW regions respectively, Equation 8-20, is:

$$\log(\eta_{low}) - \log(\eta_{high}) = \alpha \log(1.3) = 0.083 \quad (19)$$

The comparative examples provide a theoretical range for the difference in log viscosities of −0.083 to +0.083 for extremes in octene incorporation. For the Ladder polymers with LCB in the high MW fraction and variation in octene incorporation, the range of values was 0.137-0.303. These ranges provide both differences in Mark-Houwink-Sakurada parameters associated with two resins as well as error bars associated with these experimental measurements.

Values for g' are well-defined as the viscosity of a branched polymer divided by the viscosity of a linear polymer at the same absolute MW:

$$g' = \frac{[\eta]_{branched}}{[\eta]_{linear}}\bigg|_{same\ M} \quad (21)$$

There are different ways of averaging over g'. $g'_{ave}$ or average g' is the weight-averaged value of g' (B. H. Zimm, W. H. Stockmayer, J. Chem. Phys. 1949, 17, 1301). If entire polymer composition consisted of Ladder polymer, one could determine g' as it is the viscosity of the Ladder branched polymer divided by the viscosity of a linear polymer with the same absolute MW (both polymers have the same comonomer content).

The viscosity of the linear polymer is given by:

$$\log(\eta_{linear}) = \log(\beta) + \alpha \log(M) \quad (22)$$

$$\eta_{linear} = 10^{\{(\log(\beta) + \alpha \log(M)\}} \quad (23)$$

The viscosity of the Ladder polymer is given by:

$$\log(\eta_{Ladder}) = \log(\nu) + \alpha\log(M) - \alpha\log(2) \quad (24)$$

$$\eta_{Ladder} = 10^{\{\log(\beta) + \alpha\log(M) - \alpha\log(2)\}} \quad (25)$$

$$g' = \frac{10^{\{\log(\beta) + \alpha\log(M) - \alpha\log(2)\}}}{10^{\{\log(\beta) + \alpha\log(M)\}}} \bigg|_{same\ M} \quad (26)$$

$$g' = 10^{-\alpha\log(2)} \big|_{same\ M} \quad (27)$$

$$g' = 0.603, \text{ for all } M \quad (28)$$

Values of average g' for LDPE often fall below the 0.6 value. This Ladder limit of g' assumes all polymer chains are Ladder branched. Previous work (Application Nos. PCTUS2019/053524, filed Sep. 27, 2019; PCTUS2019/053527, filed Sep. 27, 2019; PCTUS2019/053529, filed Sep. 27, 2019; and PCTUS2019/053537, filed Sep. 27, 2019) has shown that not all polymer chains are Ladder branched. This work has the high majority of polymer chains produced from the single-chain catalyst where there is little or no LCB. In this case, the g'$_{ave}$ values (weight-averaged g') are much higher than previously achievable as indicated in Table 4, Table 6, and Table 9.

Ladder Character (L)

As previously discussed, there is an ongoing problem of balancing the melt properties of a polymer with the viscosity or melt index. The ethylene-based polymers of this disclosure include a low molecular weight fraction and a high molecular weight fraction. The high molecular weight fraction includes Ladder polymers, in which the Ladder polymers have tetrafunctional long-chain branching as illustrated in Scheme 3. Without intent to be bound by theory, it is believed that due to the uniqueness of the Ladder polymer in the high molecular weight fraction and the linear polymer of the low molecular weight fraction, the melt processing properties are enhanced without increasing the viscosity and decreasing the melt index such that there are no viscosity or fouling issues in the reactor.

In order to estimate Ladder character, a new parameter (L) is introduced. The Mark-Houwink-Sakurada plot (log η vs. Log M) shows two power-law dependencies (FIG. 6 and FIG. 7) where the low MW fraction is based on linear polymer and the high MW fraction is based on Ladder polymer. For a given sample, one can fit every data point to an equation where L is the fraction of Ladder polymer and (1-L) is the fraction of linear polymer:

$$\log(\eta_{linear}) = (1-L)*\log(\eta_{linear}) + L*\log(\eta_{Ladder}) \quad (29)$$

$$\log(\eta_{Linear}) = \log(\beta) + \alpha \log(M) \quad (22)$$

$$\log(\eta_{Ladder}) = \log(\beta) + \alpha \log(M) - \alpha \log(2) \quad (24)$$

$$\log(\eta) = \log(\beta) + \alpha \log(M) - L*\alpha \log(2) \quad (30)$$

Figure 8:
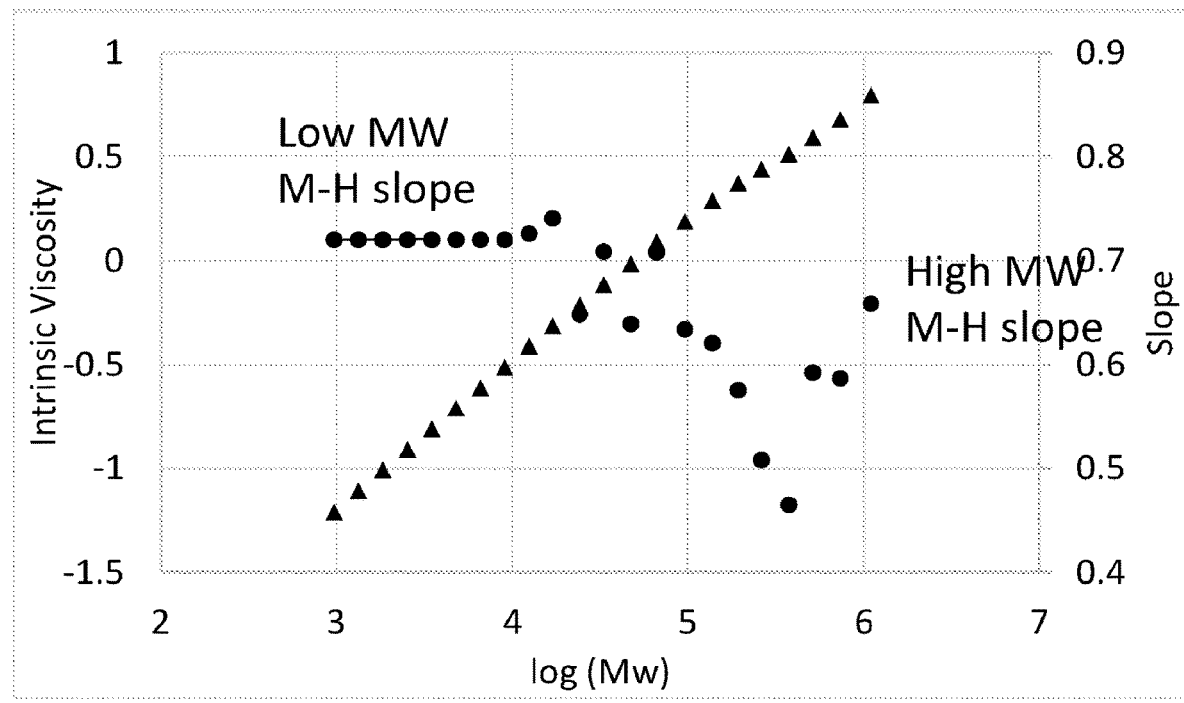
FIG. 8 is a graph showing plots of intrinsic viscosity and the slope of intrinsic viscosity as a function of absolute MW for example 3-8.

As has been previously described (Application Nos. PCTUS2019/053524, filed Sep. 27, 2019; PCTUS2019/053527, filed Sep. 27, 2019; PCTUS2019/053529, filed Sep. 27, 2019; and PCTUS2019/053537, filed Sep. 27, 2019), $S_{max}$ is the first instance of a maximum downward slope on the RHS (higher MW side) of the primary peak (absolute value of the slope) of the scaled MWD (point of inflection). If one plots the slope of the viscosity as a function of absolute $M_w$, one notices an initial slope of approximately 0.73 followed by a transition period before another slope of approximately 0.73. In the transition period, the slope decreases, then increases again before approaching 0.73. For a particular example, FIG. 8 depicts this change.

Two slopes are determined, that for the low MW and the high MW fractions. Slopes are interpolated from every 25 data points with the low MW fraction being the average of the last 5 slopes and the high MW fraction being the last slope.

Figure 9:
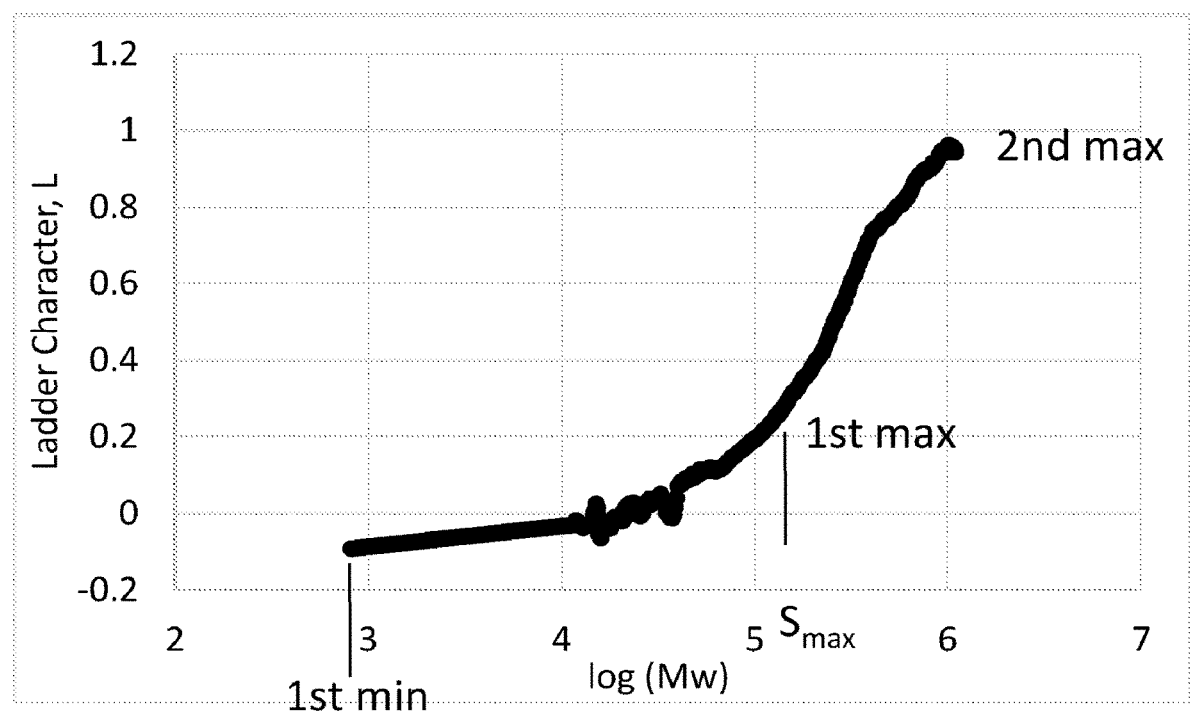
FIG. 9 shows the Ladder character, L, as a function of absolute Mw for example 3-8.

FIG. 9 depicts the Ladder character for example 3-8. The Ladder character is approximately zero below S. and then rises to approximately 1 at the high MW end.

Figure 10:
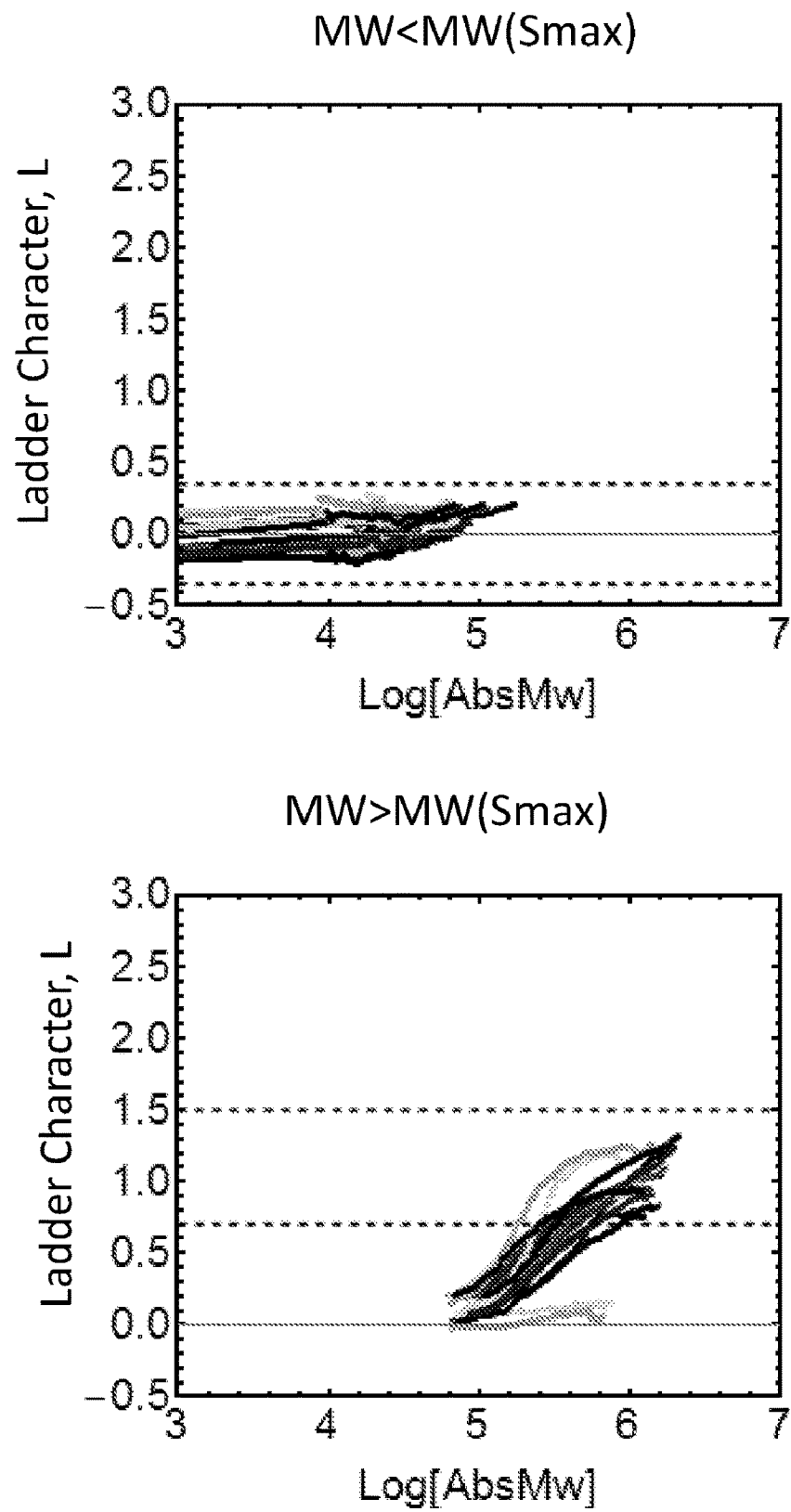
FIG. 10 is a graph of the Ladder character as a function of the log(M) before (left) and after (right) $S_{max}$ for bimodal examples.
Figure 11:
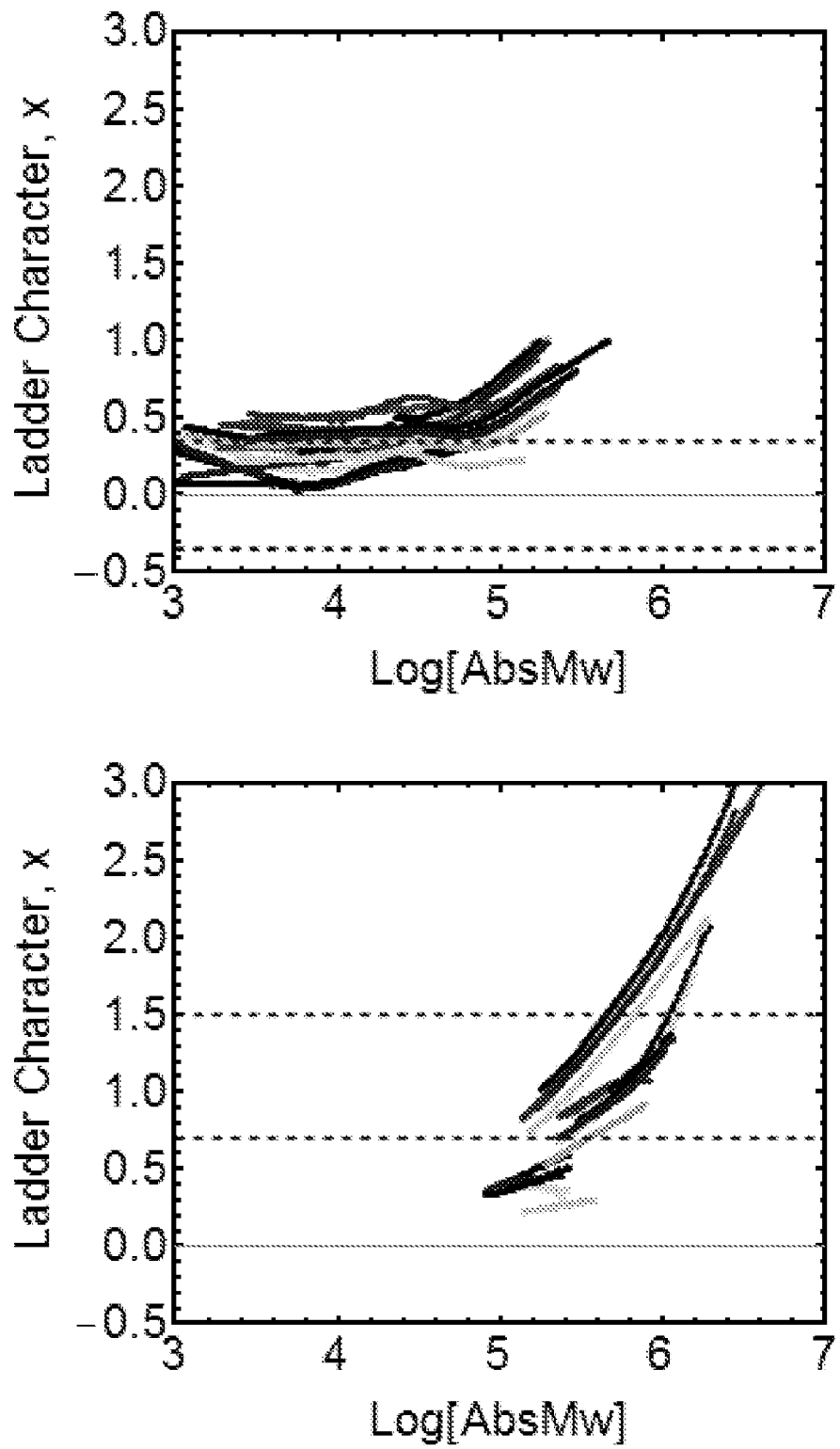
FIG. 11 is a graph of the Ladder character as a function of the log(M) before (left) and after (right) $S_{max}$ for comparative examples.

One can plot the Ladder character (L) as a function of log(M) before and after $S_{max}$. As can be seen in FIG. 10 (left), L lies between −0.35 and +0.35 for log(M)<S. (−0.35<L<0.35) for all data points in all samples. Above S. (see FIG. 10, right), L increases with log(M) with the maximum value of L ($L_{max}$) residing between 0.7 and 1.5 (0.7<$L_{max}$<1.5). Two comparative bimodal examples with no LCB are also shown in FIG. 10 and they do not meet the $L_{max}$ criteria. Prior art examples of single dual-chain catalyst (not bimodal polymers) show that both definitions are not met for any of the comparative examples (see FIG. 11).

Figure 12:
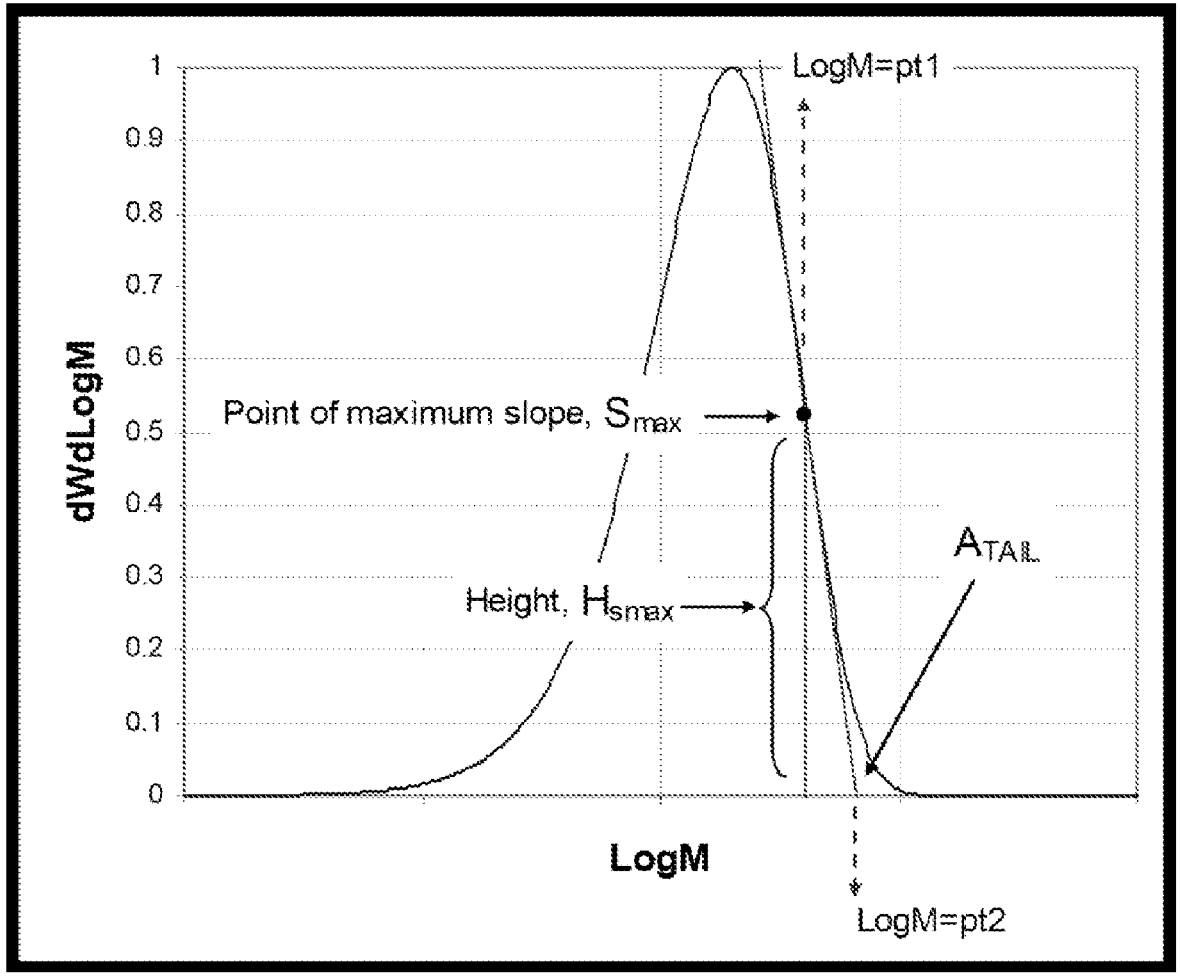
FIG. 12 is a graph of the Absolute Molecular Weight Distribution (MWD) curve illustrating how the high MWD tail area metric is defined using the point of maximum slope.

Visual inspections of the "Ladder Branched" MWD show that there is a characteristic lack of a high MW tail normally seen for branched polymers. FIG. 12 demonstrate how the model predicts a lack of tailing for "Ladder Branched" polymers. The "Ladder Branching" MWD data shows the characteristic lack of tail for many experiments but also indicates some tail formation is possible depending on polymerization conditions and diene/catalyst pairing.

Polydispersity indices ($M_w/M_n$, $M_z/M_w$, etc) are known metrics for tailing, but are not preferred due to their sensitivity to low MWD artifacts. Therefore, a more focused version of the polydispersity indices is used to develop a standard for which the integrals are performed only on the high MW portion of the MWD. The $M_w/M_n$ and $M_z/M_w$ metrics are successful in differentiating dienes "Ladder Branching" from conventional branching and are very sensitive to high MW baseline selection and baseline noise.

The area under the MWD curve is relatively insensitive to baseline issues as compared to the higher moments required to calculate MWD dispersity indices ($M_w/M_n$, $M_z/M_w$, etc). Therefore, it was decided that metrics be developed which entail the non-weighted integration of the MWD. These MWD area metrics, $A_{HIGH}$ and $A_{TAIL}$, are calculated from the GPC curve areas for defined regions on the right hand side of the MWD curve. The MWD area metrics ($A_{HIGH}$ and $A_{TAIL}$) are derived from a scaled MWD curve (dW/log M) with the primary or highest peak of the MWD defined as having a value of unity. If more than one peak have the same height, the highest MW peak is the primary peak. The independent variable in the MWD curve is Log(M), which is the logarithm of M to base 10. Both of the MWD area metrics depend on the point of maximum slope of the high MW portion of the MWD. The quantities and limits necessary for evaluating the area metrics are listed below, and demonstrated in FIG. 12.

$S_{max}$=first instance of a maximum downward slope on the RHS (higher MW side) of the primary peak (absolute value of the slope) of the scaled MWD $H_{smax}$=height of the scaled MWD at the point of maximum slope pt1=Log M value of $S_{max}$ pt2=Log M value where the $S_{max}$ tangent crosses the x-axis The MWD area metrics are defined below, where $A_{HIGH}$ is merely the area of the MWD region falling after the point of maximum slope. The second area metric, $A_{TAIL}$, is the small high MW area depicted in FIG. 12, and is evaluated by subtracting a triangular area from $A_{HIGH}$.

$$A_{HIGH} = \int_{pt1}^{\infty} MWDd\text{Log}M \tag{31}$$

$$A_{TAIL} = A_{HIGH} - 1/2(H_{smax})^2/S_{max} \tag{32}$$

With the current bimodal polymers, $A_{TAIL}$ will exceed the 0.04 value since these are bimodal polymers with a small amount of high MW, branched material. In this case, we require $A_{TAIL}$ to be greater than 0.06.

Ethylene-Based Polymers Produced from the Process of this Disclosure

Polymers produced from the "Ladder Branching", as described in Scheme 4, are included in this disclosure.

In embodiments of this disclosure, an ethylene-based polymer includes a low molecular weight polymer fraction and a high molecular weight polymer, both derived from polymerized units of ethylene, one or more dienes, and optionally, one or more $C_3$-$C_{12}$ α-olefins. The low molecular weight fraction and the high molecular weight fraction are divided by $S_{max}$ on a molecular weight distribution (MWD) curve determined via absolute gel permeation chromatography. As previously presented, $S_{max}$ is the maximum absolute slope on the higher molecular weight side of the primary peak of the MWD curve, wherein the primary peak is the peak of greatest magnitude in the MWD curve.

In the ethylene-based polymers of this disclosure, the low molecular weight polymer fraction and the high molecular weight polymer fraction each comprise a Ladder character, L. The Ladder character, L, is defined for a given absolute molecular weight (MW) as the fit of the log of the intrinsic viscosity [η] versus the log of the absolute MW (M) curve using the expression, $\log[\eta]=\log(\beta)+\alpha \log(M)-L*\alpha \log(2)$ according to a Mark-Houwink-Sakurada curve, wherein $\log(\beta)$ is the intercept and a is the slope. The low molecular weight polymer fraction has an MW below $S_{max}$ and all values of L between −0.35 to 0.35; and the high molecular weight polymer fraction has an MW above S. and a maximum value of L between 0.8 and 1.5.

In embodiments of this disclosure, the ethylene-based polymers comprise a melt strength (MS) greater than negative 17 times the log base 10 of the melt index plus 25 (MS>−17*log (MI)+25). In this equation, MS is the melt strength in cN (Rheotens device, 190° C., 2.4 mm/s², 120 mm from the die exit to the center of the wheels, extrusion rate of 38.2 s⁻¹, capillary die of 30 mm length, 2 mm diameter and 180° entrance angle) and the MI is the melt index in g/10 min according to ASTM D1238. In some embodiments, the melt strength (MS) greater than negative 17 times the log of the melt index plus 30 (MS>—17*log (MI)+30). In various embodiments, the melt strength (MS) greater than negative 17 times the log of the melt index plus 35 (MS>—17*log (MI)+35). As previously mentioned, generally, when the melt strength increase, the melt index decreases. As shown by this equation, the melt strength can increase (such that the polymer has a melt strength of 20 cN) and the melt index remains in a normal range (such as 0.1 to 5).

In embodiments of this disclosure, the ethylene-based polymers include polymerized units derived from ethylene, diene, and optionally, one or more $C_3$-$C_{12}$ α-olefins. The ethylene-based polymer includes a melt viscosity ratio ($V_{0.1}/V_{100}$) at 190° C. greater than 20 and an average g' greater than 0.86, where the average g' is an intrinsic viscosity ratio determined by gel permeation chromatography using a triple detector. In some embodiments, the ethylene-based polymer has a melt strength of greater than 10 cN.

In embodiments of this disclosure, the ethylene-based polymers include polymerized units derived from ethylene, diene, and optionally one or more $C_3$-$C_{12}$ α-olefins. The ethylene-based polymers include a melt strength greater than 10 cN; and an average g' greater than 0.86, where the average g' is an intrinsic viscosity ratio determined by gel permeation chromatography using a triple detector. In one or more embodiments, the ethylene-based polymer has a melt viscosity ratio ($V_{0.1}/V_{100}$) at 190° C. that is greater than 20.

In one or more embodiments, the ethylene-based polymer includes a low molecular weight polymer fraction and a high molecular weight polymer fraction, wherein the low molecular weight polymer fraction and the high molecular weight polymer fraction each comprise polymerized units derived from ethylene, diene, and optionally, one or more $C_3$-$C_{12}$ α-olefins.

In one or more embodiments, average g' is greater than 0.860, where the average g' is an intrinsic viscosity ratio determined by gel permeation chromatography using a triple detector. In some embodiments, the average g' is greater than 0.880. In one or more embodiments, the ethylene-based polymer has an average g' greater than 0.700. In various embodiments, the average g' is greater than 0.900.

In some embodiments, the high molecular weight polymer fraction includes 0.5 to 30 percent by weight (% by wt.) of the polymer. In other embodiments, the high molecular weight polymer fraction comprises between 1 and 15% by weight of the polymer.

In one or more embodiments, all values L of the low molecular weight polymer fraction are between −0.2 to 0.2. In some embodiments, the maximum value of L of the high molecular weight polymer fraction is from 0.9 to 1.1.

In various embodiments, the ethylene-based polymer has a molecular weight tail quantified by an MWD area metric, $A_{TAIL}$, and $A_{TAIL}$ is greater than 0.06 as determined by gel permeation chromatography using a triple detector. In one or more embodiments, the $A_{TAIL}$ is greater than 0.08 or the $A_{TAIL}$ is greater than 0.10.

In some embodiments, the ethylene-based polymer has a weight averaged molecular weight ($M_W$) of less than or equal to 250,000 Daltons, as determined by absolute gel permeation chromatography. In one or more embodiments, the ethylene-based polymer has a weight averaged molecular weight ($M_W$) of less than or equal to 150,000 Daltons or less than or equal to 100,000 Daltons, as determined by absolute gel permeation chromatography.

In one or more embodiments, the melt index (MI) is greater than 0.1, in which MI is the melt index in g/10 min according to ASTM D1238. In some embodiments, the MI is from 0.1 to 5.0 or from 0.3 to 3.0. In various embodiments, MI is greater than 1 or greater than 2. In some embodiments, the MI is greater than 3, in which MI is the melt index in g/10 min according to ASTM D1238.

In some embodiments, the melt strength of the ethylene-based polymer is greater than 10 cN (Rheotens device, 190° C., 2.4 mm/s$^2$, 120 mm from the die exit to the center of the wheels, extrusion rate of 38.2 s$^{-1}$, capillary die of 30 mm length, 2 mm diameter and 180° entrance angle). In one or more embodiments, the MS is greater than 20 cN, greater than 30 cN, or greater than 45 cN. In some embodiments, the MS is greater than 50 cN.

In various embodiments, the ethylene-based polymer comprises the melt viscosity ratio ($V_{0.1}/V_{100}$) at 190° C. is greater than 25. In some embodiments, the melt viscosity ratio ($V_{0.1}/V_{100}$) at 190° C. is greater than 30.

The "melt strength" has units of centi-Newtons (cN) and determined by Rheotens device, 190° C., 2.4 mm/s$^2$, 120 mm from the die exit to the center of the wheels, extrusion rate of 38.2 s$^{-1}$, capillary die of 30 mm length, 2 mm diameter and 180° entrance angle.

The "rheology ratio" and "melt viscosity ratio" are defined by $V_{0.1}/V_{100}$ at 190° C., where $V_{0.1}$ is the viscosity of the ethylene-based polymer at 190° C. at an angular frequency of 0.1 radians/second, and $V_{100}$ is the viscosity of the ethylene-based polymer at 190° C. at an angular frequency of 100 radians/second.

The long-chain branching polymerization processes described in the preceding paragraphs are utilized in the polymerization of olefins, primarily ethylene. In some embodiments, there is only a single type of olefin or α-olefin in the polymerization scheme, creating what is essentially a homopolymer with small amounts of incorporated diene comonomer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, 4-methyl-1-pentene, and ethylidene norbornene. For example, the one or more α-olefin co-monomers may be selected from the group consisting of propylene, 1-butene, 1-hexene, and 1-octene; or in the alternative, from the group consisting of 1-hexene and 1-octene.

The long-chain branched polymer, for example homopolymers and/or interpolymers (including copolymers) of ethylene and optionally one or more co-monomers such as α-olefins, may comprise at least 50 percent by mole of units derived from ethylene. All individual values and subranges encompassed by "from at least 50 mole percent" are disclosed herein as separate embodiments; for example, the ethylene-based polymers, homopolymers and/or interpolymers (including copolymers) of ethylene and optionally one or more co-monomers such as α-olefins may comprise at least 60 percent by mole of units derived from ethylene; at least 70 percent by mole of units derived from ethylene; at least 80 percent by mole of units derived from ethylene; or from 50 to 100 percent by mole of units derived from ethylene; or from 80 to 100 percent by mole of units derived from ethylene.

In some embodiments of the ethylene-based polymers, the ethylene-based polymer includes additional α-olefin. The amount of additional α-olefin in the ethylene-based polymer is less than or equal to 50 mole percent (mol %); other embodiments the amount of additional α-olefin includes at least 0.01 mol % to 25 mol %; and in further embodiments the amount of additional α-olefin includes at least 0.1 mol % to 10 mol %. In some embodiments, the additional α-olefin is 1-octene.

In some embodiments, the long-chain branched polymers may comprise at least 50 percent by mole of units derived from ethylene. All individual values and subranges from at least 90 mole percent are included herein and disclosed herein as separate embodiments. For example, the ethylene based polymers may comprise at least 93 percent by mole of units derived from ethylene; at least 96 percent by mole of units; at least 97 percent by mole of units derived from ethylene; or in the alternative, from 90 to 100 percent by mole of units derived from ethylene; from 90 to 99.5 percent by mole of units derived from ethylene; or from 97 to 99.5 percent by mole of units derived from ethylene.

In some embodiments of the long-chain branched polymer, the amount of additional α-olefin is less than 50%; other embodiments include at least 1 mole percent (mol %) to 20 mol %; and in further embodiments the amount of additional α-olefin includes at least 5 mol % to 10 mol %. In some embodiments, the additional α-olefin is 1-octene.

Any conventional polymerization processes may be employed to produce the long-chain branched polymer. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a single loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the long-chain branched polymer may be produced via solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs. In some embodiments, the long-chain branching polymerization process for producing the long-chain branched polymer includes polymerizing ethylene and optionally, at least one additional α-olefin in the presence of a catalyst system.

The long-chain branched polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene based polymers and the one or more additives. The ethylene-based polymers may further comprise fillers, which may include, but are not limited to, organic or inorganic fillers. The long-chain branched polymers may contain from about 0 to about 20 weight percent fillers such as, for example, calcium carbonate, talc, or $Mg(OH)_2$, based on the combined weight of the ethylene based polymers and all additives or fillers. The ethylene-based polymers may further be blended with one or more polymers to form a blend.

In some embodiments, the polymerization process for producing long-chain branched polymers may include polymerizing ethylene and at least one additional α-olefin in the presence of a catalyst having two polymer producing sites. The long-chain branched polymer resulting from such the catalyst having two polymer producing sites may have a density according to ASTM D792 (incorporated herein by reference in its entirety) from 0.850 $g/cm^3$ to 0.960 $g/cm^3$, from 0.880 $g/cm^3$ to 0.920 $g/cm^3$, from 0.880 $g/cm^3$ to 0.910 $g/cm^3$, or from 0.880 $g/cm^3$ to 0.900 $g/cm^3$, for example.

In another embodiment, the long-chain branched polymer resulting from the long-chain polymerization process may have a melt flow ratio ($I_{10}/I_2$) from 5 to 100, in which melt index 12 is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 50, in others, the melt flow ratio is from 5 to 25, in others, the melt flow ratio is from 5 to 9.

In some embodiments, the long-chain branched polymer resulting from the long-chain polymerization process may have a molecular-weight distribution (MWD) from 1 to 20, where MWD is defined as $M_w/M_n$ with $M_w$ being a weight average molecular weight and $M_n$ being a number average molecular weight using light scattering. In other embodiments, the polymers resulting from the catalyst system have a MWD from 1 to 10. Another embodiment includes a MWD from 1 to 3; and other embodiments include MWD from 1.5 to 2.5.

Gel Permeation Chromatography (GPC) (Conventional GPC)

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all absolute Light scattering measurements, the 15 degree angle is used for measurement. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 33 (as described in Williams and Ward, J. Polym. Sci., Polym. Let., 6, 621 (1968)).:

$$M_{polyethylene} = A \times (M_{polystyrene})^B \quad (33)$$

where M is the molecular weight, A has a value of 0.4315 and B is equal to 1.0.

A polynomial between $3^{rd}$ and $5^{th}$ order was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation). The plate count (Equation 34) and symmetry (Equation 35) were measured on a 200 microliter injection according to the following equations:

$$\text{Plate Count} = 5.54 * \left( \frac{(RV_{Peak\ Max})}{\text{Peak Width at } \frac{1}{2} \text{height}} \right)^2 \quad (34)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (35)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 36-38, using PolymerChar GPCOne™ software, the baseline-subtracted IR chromatogram at each equally-spaced data collection point (i), and the polyethylene equivalent molecular weight obtained from the narrow standard calibration curve for the point (i).

$$Mn_{(GPC)} = \frac{\sum_i IR_i}{\sum_i (IR_i / M_{polyethylene_i})} \quad (36)$$

$$Mw_{(GPC)} = \frac{\sum_{i}(IR_i * M_{polyethylene_i})}{\sum_{i} IR_i} \quad (37)$$

$$Mz_{(GPC)} = \frac{\sum_{i}(IR_i * M_{polyethylene_i}^2)}{\sum_{i}(IR_i * M_{polyethylene_i})} \quad (38)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate$_{(nominal)}$) for each sample by RV alignment of the respective decane peak within the sample (RV$_{(FM\ Sample)}$) to that of the decane peak within the narrow standards calibration (RV$_{(FM\ Calibrated)}$). Any changes in the time of the decane marker peak are then assumed to be related to a linear-shift in flowrate (Flowrate$_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 26. Processing of the flow marker peak was done via the PolymerChar GPCOne™ Software. Acceptable flowrate correction is such that the effective flowrate should be within +/−2% of the nominal flowrate.

Flowrate$_{(effective)}$=Flowrate$_{(nominal)}$*(RV$_{(FM\ Calibrated)}$/RV$_{(FM\ Sample)}$) (39)

Triple Detector GPC (TDGPC) (Absolute GPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (M$_w$/M$_n$>3) to the narrow standard column calibration results from the narrow standards calibration curve using PolymerChar GPCOne™ Software.

The absolute molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, is obtained from the mass detector area and the mass detector constant, derived from a suitable linear polyethylene homopolymer, or one of the polyethylene standards of known weight average molecular weight. The calculated molecular weights (using GPCOne™) are obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) may be determined from a linear standard with a molecular weight in excess of about 50,000 g/mole. The viscometer calibration (determined using GPCOne™) may be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight (M$_{w(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, M$_{n(Abs)}$ and M$_{z(Abs)}$ are be calculated according to equations 40-41 as follows:

$$Mn_{(Abs)} = \frac{\sum_{i} IR_i}{\sum_{i}(IR_i/M_{Absolute_i})} \quad (40)$$

$$Mz_{(Abs)} = \frac{\sum_{i}(IR_i * M_{Absolute_i}^2)}{\sum_{i}(IR_i * M_{Absolute_i})} \quad (41)$$

Dynamic Mechanical Spectrum (or Small Angle Oscillatory Shear)

The complex viscosity (η*), moduli (G', G"), tan delta, and phase angle (δ) are obtained by dynamic oscillatory frequency sweep test in a frequency range from 0.1 to 100 rad/s, at 190° C. The level of strain is set within the linear viscoelastic regime as identify by a strain sweep test at 100 rad/s at 190° C. Tests are performed with stainless steel parallel plates of 25 mm diameter on a strain controlled rheometer ARES-G2 by TA Instruments. Samples of 3.3 mm thickness are squeezed and then trimmed in two steps prior to the actual test. In the first step, the sample are allowed to melt for 2.5 min, squeezed to 3 mm gap and trimmed. After an additional 2.5 min of soak time at 190° C., the sample are squeezed to 2 mm gap, and the excess of material trimmed. The method has an additional five minute delay built in to allow the system to reach thermal equilibrium. Tests are performed under nitrogen atmosphere.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter (Micro Motion). For some experiments, the standard conditions at 150° C. are 25 g ethylene, 22 g 1-octene, 240 psi hydrogen in 575 g of IsoparE, and in other experiments, the standard conditions at 150° C. are 22 g ethylene, no 1-octene, 192 psi hydrogen in 602 g of IsoparE.

The procatalyst and activators are mixed with the appropriate amount of purified toluene to achieve a desired molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

Examples

Bimodal Ladder Branching with Two Catalysts

The bimodal polymers were produced with a dual-chain catalyst (Catalyst 1) {(a) Figueroa, R.; Froese, R. D.; He, Y.; Klosin, J.; Theriault, C. N.; Abboud, K. A. *Organometallics* 2011, 30, 1695-1709, (b) Froese, R. D.; Jazdzewski, B. A.; Klosin, J.; Kuhlman, R. L.; Theriault, C. N.; Welsh, D. M; Abboud, K. A. *Organometallics* 2011, 30, 251-262.} and single-chain catalysts (Catalysts 2, 3 and 4). Dienes used were 1,4-pentadiene (pentadiene) and dimethyldivinylsilane (divinylsilane).

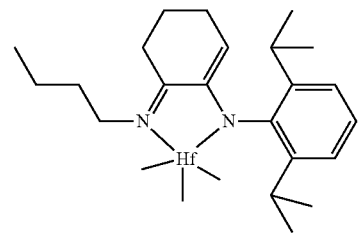

Catalyst 1:
Dual-chain catalyst

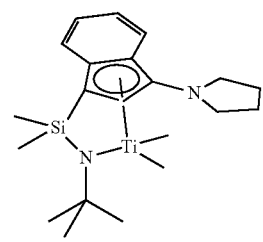

Catalyst 2
Single-chain catalyst

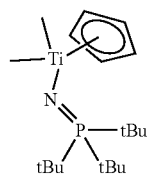

Catalyst 3
Single-chain catalyst

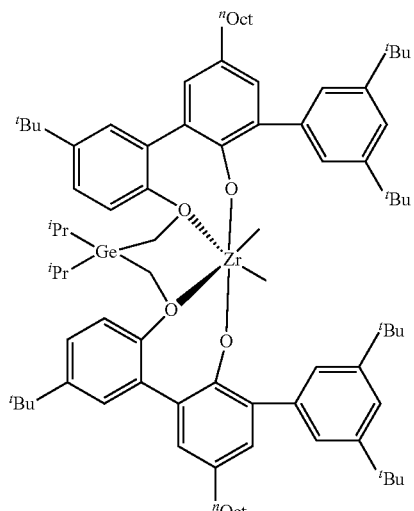

Catalyst 4
Single-Chain Catalyst

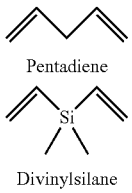

Pentadiene

Divinylsilane

The comparative examples include polymerization reactions that excluded diene (3-C1, 3-C2), in addition polymerization reaction that included only a single dual-chain catalyst runs, comparatives 3-C12, 3-C13, 3-C14. The procedure for making the comparative may be found in Application Nos. PCTUS2019/053524, filed Sep. 27, 2019; PCTUS2019/053527, filed Sep. 27, 2019; PCTUS2019/053529, filed Sep. 27, 2019; and PCTUS2019/053537, filed Sep. 27, 2019, which are herein incorporated by reference.

In each example containing diene, the amount of diene incorporated into the reactor was small in comparison to the other reactants in the reactor. Therefore, the addition of diene did not affect the amount of comonomer, ethylene, and solvent added into the reactor.

TABLE 2

Batch reactor conditions for polymerization with Catalyst 1 and Catalyst 2.

| Entry | Catalyst 1 μmol | Activator μmol | Hydrogen Δ psi | Octene g | Isopar E g | diene | diene g |
|---|---|---|---|---|---|---|---|
| 3-C1 | 0.25 | 0.42 | 193 | 0 | 605 | none | |
| 3-C2 | 0.25 | 0.42 | 191 | 0 | 595 | none | |
| 3-3 | 0.25 | 0.42 | 193 | 0 | 602 | pentadiene | 0.2 |
| 3-4 | 0.25 | 0.42 | 212 | 0 | 600 | pentadiene | 0.2 |
| 3-5 | 0.3 | 0.48 | 155 | 22 | 578 | divinylsilane | 0.2 |
| 3-6 | 0.2 | 0.36 | 192 | 0 | 602 | divinylsilane | 0.15 |
| 3-7 | 0.2 | 0.36 | 191 | 0 | 596 | divinylsilane | 0.25 |
| 3-8 | 0.2 | 0.36 | 153 | 22 | 574 | divinylsilane | 0.25 |
| 3-9 | 0.2 | 0.36 | 106 | 22 | 579 | divinylsilane | 0.2 |
| 3-10 | 0.3 | 0.48 | 104 | 22 | 577 | pentadiene | 0.3 |
| 3-11 | 0.2 | 0.36 | 192 | 0 | 596 | divinylsilane | 0.2 |

0.1 μmol Catalyst 2, 10 μmol MMAO-3A, 25 g ethylene, T = 150° C., Activator: methyldi($C_{18}H_{37}$)ammonium tetrakis(pentafluorophenyl)borate.

TABLE 3

Batch reactor conditions for previous comparatives (Examples come from Application No. PCTUS2019/053524).

| Entry | Catalyst 1 μmol | Activator μmol | Hydrogen Δ psi | Octene g | Isopar E g | diene | diene g |
|---|---|---|---|---|---|---|---|
| 3-C12 | 0.3 | 0.36 | 200 | 45 | 555 | decadiene | 0.3 |
| 3-C13 | 0.3 | 0.36 | 200 | 45 | 555 | decadiene | 0.25 |
| 3-C14 | 0.4 | 0.48 | 240 | 0 | 600 | decadiene | 0.20 |

10 μmol MMAO-3A, 14 g ethylene, T = 150° C., Activator: methyldi($C_{18}H_{37}$)ammonium tetrakis(pentafluorophenyl)

TABLE 4

Molecular weight and octene incorporation data for samples in Table 2 and Table 3.

| | | Conventional GPC | | Absolute GPC | | | | |
|---|---|---|---|---|---|---|---|---|
| Entry | Yield g | Mn g/mol | Mw g/mol | Mn g/mol | Mw g/mol | mol % Octene | $A_{TAIL}$ | Average g' |
| 3-C1 | 23.9 | 15,282 | 76,466 | 14,633 | 76,087 | 0 | 0.131 | 0.927 |
| 3-C2 | 24.2 | 16,517 | 75,314 | 15,112 | 69,774 | 0 | 0.123 | 1.0 |
| 3-3 | 20.5 | 14,977 | 117,086 | 13,652 | 127,342 | 0 | 0.191 | 0.940 |
| 3-4 | 20.2 | 14,130 | 107,538 | 12,930 | 115,104 | 0 | 0.192 | 0.941 |
| 3-5 | 25.2 | 11,466 | 93,945 | 10,958 | 101,617 | 2.4 | 0.166 | 0.862 |
| 3-6 | 19.6 | 14,247 | 95,650 | 11,976 | 94,667 | 0 | 0.163 | 0.961 |
| 3-7 | 20.3 | 15,508 | 112,983 | 13,766 | 119,489 | 0 | 0.200 | 0.946 |
| 3-8 | 21.6 | 14,484 | 84,594 | 13,098 | 89,331 | 1.9 | 0.122 | 0.901 |
| 3-9 | 22.6 | 16,917 | 108,131 | 16,247 | 115,794 | 1.8 | 0.120 | 0.864 |
| 3-10 | 25.7 | 20,827 | 135,671 | 19,448 | 151,645 | 2.1 | 0.177 | 0.869 |
| 3-11 | 18.4 | 13,974 | 107,616 | 13,168 | 112,029 | 0 | 0.188 | 0.940 |
| 3-C12 | 37.1 | 19,740 | 91,498 | 23,947 | 116,322 | 6.5 | 0.019 | 0.704 |
| 3-C13 | 52.3 | 26,464 | 86,818 | 32,257 | 110,354 | 6.8 | 0.023 | 0.688 |
| 3-C14 | 8.2 | 31,246 | 149,195 | 29,735 | 242,736 | 0 | 0.075 | 0.799 |

TABLE 5

Ladder character and Mark-Houwink slopes for samples in Table 2 and Table 3.

| | Ladder Character | | | | Mark-Houwink slopes | | |
|---|---|---|---|---|---|---|---|
| | Low | Low | | High | | | |
| Entry | MW Min | MW max | Smax | MW Max | Low MW | High MW | Difference |
| 3-C1 | 0.036 | 0.186 | 4.86 | 0.158 | 0.72 | 0.69 | 0.03 |
| 3-C2 | −0.177 | −0.027 | 4.82 | 0.103 | 0.73 | 0.79 | −0.07 |
| 3-3 | −0.112 | 0.031 | 4.85 | 1.240 | 0.72 | 0.54 | 0.18 |
| 3-4 | −0.126 | 0.026 | 4.82 | 1.096 | 0.72 | 0.59 | 0.13 |
| 3-5 | −0.048 | 0.175 | 4.92 | 0.986 | 0.72 | 0.67 | 0.05 |
| 3-6 | −0.189 | 0.011 | 4.87 | 0.763 | 0.73 | 0.64 | 0.09 |
| 3-7 | −0.207 | 0.029 | 4.88 | 0.834 | 0.75 | 0.67 | 0.08 |
| 3-8 | −0.093 | 0.189 | 5.00 | 0.962 | 0.72 | 0.66 | 0.06 |
| 3-9 | −0.016 | 0.175 | 5.06 | 0.951 | 0.71 | 0.69 | 0.02 |
| 3-10 | −0.070 | 0.202 | 5.03 | 1.320 | 0.72 | 0.60 | 0.12 |
| 3-11 | −0.152 | 0.076 | 4.94 | 0.912 | 0.72 | 0.64 | 0.07 |
| 3-C12 | 0.295 | 0.840 | 5.41 | 1.283 | 0.73 | 0.53 | 0.20 |
| 3-C13 | 0.472 | 0.837 | 5.36 | 1.078 | 0.74 | 0.72 | 0.02 |
| 3-C14 | −0.200 | 0.982 | 5.67 | 2.915 | 0.66 | 0.21 | 0.45 |

TABLE 6

Shear and extensional rheology for samples in Table 2 and Table 3.

| Entry | $V_{0.1}$ Pa s | $V_1$ Pa s | $V_{100}$ Pa s | Rheology Ratio (RR) | MI g/10 min | MS cN | Ext mm/s | Average g' |
|---|---|---|---|---|---|---|---|---|
| 3-C1 | | | | | | | | 0.927 |
| 3-C2 | 1,919 | 1,534 | 559 | 3.4 | 5.5 | | | 1.0 |
| 3-3 | | | | | | | | 0.940 |
| 3-4 | | | | | | | | 0.941 |
| 3-5 | 24,742 | | 606 | 40.8 | 0.6 | 12 | 67 | 0.862 |
| 3-6 | 18,570 | 5,457 | 578 | 32.1 | 0.7 | 12 | 60 | 0.961 |
| 3-7 | 80,773 | 15,313 | 819 | 98.6 | 0.2 | 14 | 50 | 0.946 |
| 3-8 | 12,080 | 4,239 | 601 | 20.1 | 1.1 | 16 | 60 | 0.901 |
| 3-9 | 29,198 | 8,209 | 1,156 | 25.3 | 0.4 | | | 0.864 |
| 3-10 | 56,634 | 11,695 | 1,048 | 54.0 | 0.2 | 57 | 39 | 0.869 |
| 3-11 | | | | | | | | 0.940 |
| 3-C12 | 27,457 | | 974 | 28.2 | 0.4 | 9 | 75 | 0.704 |
| 3-C13 | 17,643 | | 857 | 20.6 | 0.7 | 9 | 200 | 0.688 |
| 3-C14 | 909,000 | | 3,054 | 297.6 | | | | 0.799 |

MI estimated from viscosities: $MI=10^{\{4.7435-0.88267*Log(V_{0.1})-0.40245*Log(V_{100})\}}$

TABLE 7

Mark-Houwink-Sakurada fit parameters for samples in Table 2 and Table 3.

| Entry | $Log(\eta)^1$ | $Log(\eta)^2$ | $\Delta Log(\eta)^3$ | $\Delta Log(\eta)^4$ | % wt fraction of high MW component |
|---|---|---|---|---|---|
| 3-C1 | 0.890 | 0.873 | 0.042 | 0.018 | 10 |
| 3-C2 | 0.853 | 0.845 | 0.039 | 0.015 | 9 |
| 3-3 | 1.205 | 1.194 | 0.279 | 0.277 | 17 |
| 3-4 | 1.150 | 1.138 | 0.247 | 0.242 | 18 |
| 3-5 | 1.044 | 1.037 | 0.219 | 0.218 | 28 |
| 3-6 | 1.057 | 1.045 | 0.175 | 0.173 | 18 |
| 3-7 | 1.130 | 1.114 | 0.191 | 0.189 | 24 |
| 3-8 | 1.020 | 1.009 | 0.217 | 0.215 | 21 |
| 3-9 | 1.084 | 1.072 | 0.215 | 0.215 | 18 |
| 3-10 | 1.219 | 1.211 | 0.292 | 0.295 | 19 |
| 3-11 | 1.095 | 1.082 | 0.207 | 0.207 | 28 |
| 3-C12 | 0.964 | 0.939 | 0.284 | 0.286 | 0 |
| 3-C13 | 0.924 | 0.904 | 0.244 | 0.243 | 0 |
| 3-C14 | 1.403 | 1.389 | 0.632 | 0.631 | 0 |

[1] $log(\eta)$ at $log(M)$ where weight fraction of polymer is 0.03.
[2] For the five lowest weight fractions of polymer above 0.03, average of the $log(\eta)$ measurements.
[3] Difference between the value in footnote 1 and the standard, $log(\eta) = -3.4 + 0.73 log(M)$.
[4] Difference between the value in footnote 2 and the standard, $log(\eta) = -3.4 + 0.73 log(M)$.

Comparative examples 3-C2 has an average g' of 1.0, but melt viscosity ratio is 3.4 indicative of linear polymer structure. Comparative examples 3-C12, 3-C13, and 3-C14 have g' values less than 0.86. In comparison, the inventive examples 3-5 to 3-9 have a melt viscosity ratio of greater than 20 and an average g' value of greater than 0.860.

TABLE 8

Batch reactor conditions for polymerization with Catalyst 1 and Catalyst 2.

| Entry | Catalyst 1 μmol | Activator μmol | Hydrogen Δ psi | Diene | diene g |
|---|---|---|---|---|---|
| 3-15 | 0.4 | 0.6 | 84 | Pentadiene | 0.3 |
| 3-16 | 0.2 | 0.36 | 107 | Pentadiene | 0.2 |
| 3-17 | 0.3 | 0.48 | 107 | Pentadiene | 0.1 |
| 3-18 | 0.2 | 0.36 | 103 | divinylsilane | 0.2 |
| 3-19 | 0.2 | 0.36 | 106 | Pentadiene | 0.4 |
| 3-20 | 0.3 | 0.48 | 103 | Pentadiene | 0.2 |
| 3-21 | 0.3 | 0.48 | 104 | Pentadiene | 0.3 |
| 3-22 | 0.3 | 0.48 | 154 | Pentadiene | 0.3 |
| 3-23 | 0.2 | 0.36 | 105 | Pentadiene | 0.3 |
| 3-24 | 0.3 | 0.48 | 152 | Pentadiene | 0.2 |
| 3-25 | 0.2 | 0.36 | 154 | Pentadiene | 0.3 |
| 3-26 | 0.3 | 0.48 | 154 | Pentadiene | 0.1 |
| 3-27 | 0.1 | 0.24 | 58 | Divinylsilane | 0.3 |

0.1 μmol Catalyst 2, 10 μmol MMAO-3A, 25 g ethylene, 22 g octene, 580 g IsoParE, T = 150° C., Activator: methyldi($C_{18}H_{37}$)ammonium tetrakis(pentafluorophenyl)borate.

TABLE 9

Molecular weight, octene incorporation, and melting point data for samples in Table 8.

| | Conventional GPC | | | | | | % wt fraction |
|---|---|---|---|---|---|---|---|
| Entry | Yield g | Mn g/mol | Mw g/mol | PDI | mol % octene | Tm ° C. | Average g' | of high MW component |
| 3-15 | 32.2 | 24,927 | 153,468 | 6.2 | 2.7 | 115.8 | | 22 |
| 3-16 | 30.9 | 11,816 | 92,298 | 7.8 | 2.0 | 115.8 | | |
| 3-17 | 30.4 | 21,704 | 98,049 | 4.5 | 2.4 | 116.2 | | |
| 3-18 | 22.8 | 14,693 | 105,126 | 7.2 | 2.0 | 116.1 | 0.864 | 18 |
| 3-19 | 30.6 | 21,363 | 99,800 | 4.7 | 1.9 | 114.0 | | |
| 3-20 | 32.3 | 26,650 | 111,765 | 4.2 | 2.6 | 115.2 | | |
| 3-21 | 25.7 | 20,827 | 135,671 | 6.5 | 2.1 | 117.4 | 0.869 | 19 |

TABLE 9-continued

Molecular weight, octene incorporation, and melting point data for samples in Table 8.

| | | Conventional GPC | | | | | | % wt fraction |
|---|---|---|---|---|---|---|---|---|
| Entry | Yield g | Mn g/mol | Mw g/mol | PDI | mol % octene | Tm ° C. | Average g' | of high MW component |
| 3-22 | 26.1 | 21,200 | 76,374 | 3.6 | 4.2 | 117.5 | | 12 |
| 3-23 | 29.2 | 25,400 | 78,326 | 3.1 | 3.3 | 113.8 | | |
| 3-24 | 32.9 | 21,750 | 74,951 | 3.4 | 6.1 | 115.6 | | |
| 3-25 | 30.2 | 21,500 | 72,147 | 3.4 | 3.1 | 113.3 | | |
| 3-26 | 34.1 | 22,500 | 74,467 | 3.3 | 2.8 | 114.4 | | |
| 3-27 | 17.7 | 34,459 | 127,287 | 3.7 | 1.5 | 116.4 | 0.881 | |

TABLE 10

Shear and extensional rheology for samples in Table 8.

| Entry | $V_{0.1}$ Pa s | $V_1$ Pa s | $V_{100}$ Pa s | RR | MI g/10 min | MS cN | Ext mm/s |
|---|---|---|---|---|---|---|---|
| 3-15 | 104,000 | | 1,150 | 90.0 | 0.1 | 120 | 40 |
| 3-16 | 8,519 | 2,490 | 442 | 19.3 | 1.6 | 29 | 47 |
| 3-17 | 15,885 | 5,010 | 780 | 20.4 | 0.7 | 24 | 51 |
| 3-18 | 27,358 | 7,645 | 1,063 | 25.7 | 0.4 | 36 | 66 |
| 3-19 | 10,010 | | 455 | 22.0 | 1.4 | 79 | 47 |
| 3-20 | 18,772 | | 819 | 22.9 | 0.6 | 57 | 38 |
| 3-21 | 36,608 | 11,695 | 826 | 44.3 | 0.3 | 57 | 39 |
| 3-22 | 5,473 | | 329 | 16.6 | 2.7 | 29 | 45 |
| 3-23 | 13,077 | | 637 | 20.5 | 1.0 | 41 | 72 |
| 3-24 | 21,695 | | 515 | 42.1 | 0.7 | 18 | 51 |
| 3-25 | 10,070 | | 390 | 25.8 | 1.5 | 23 | 72 |
| 3-26 | 7,060 | | 465 | 15.2 | 1.9 | 8 | 165 |
| 3-27 | 33,392 | | 2,404 | 13.9 | 0.2 | 63 | 50 |

MI estimated from viscosities: MI=10^^{4.7435−0.88267*Log($V_{0.1}$)−0.40245*Log($V_{100}$)}

Table 8, Table 9 and Table 10 collect examples of bimodal polymers with small amounts of diene present. Run conditions are provided in Table 8 while MW and comonomer incorporation data are collected in Table 9. Table 10 provides the shear and extensional rheology including melt strength as well as the melt index values. Melt strengths are one of the critical values as this number relates to bubble stability on blown film lines.

Table 8 provides a design of experiments where a variation in Catalyst 1 loading, hydrogen added, and diene added (pentadiene) affects the melt index. One skilled in the art would know how varying these conditions generally affect MI and MS: i) Catalyst 1 is the higher MW fraction, thus the greater the amount of Catalyst 1, the greater the weight fraction of the higher MW fraction, thus the lower the MI, ii) the more hydrogen, the lower is the overall MW, the higher is the MI, iii) the more diene added, the more LCB in the Ladder fraction, the lower the MI. As the three parameters are varied, MI and MS also change as indicated in Table 10.

Figure 13:
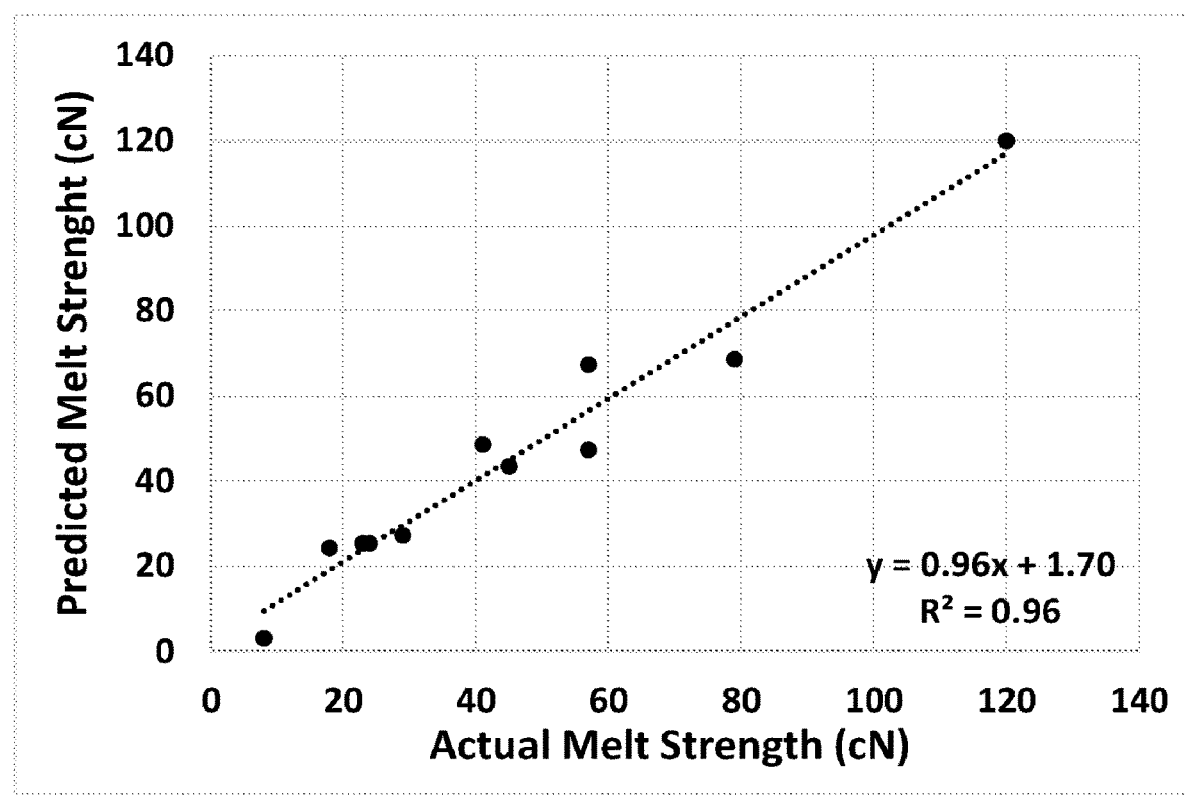
FIG. 13 is a graph that includes three-parameter linear least squares fit of the melt-strength to Catalyst 1 loading, hydrogen, and diene.

With a simple linear least squares fit of the three parameters, Catalyst 1 loading (μmol), hydrogen (psi), and diene added (g), one can fit the MS for the runs including pentadiene (FIG. 13):

$$MS=185.3*\text{Catalyst 1}(\mu mol)-0.48*H2(psi)+204.4*\text{pentadiene}(g)+24.48 \qquad (42)$$

As expected, higher Catalyst 1 loading, lower hydrogen, and more pentadiene lead to higher melt strengths.

In Table 11, the reactor conditions for the polymerizations reaction of entry 3-28 and 3-29. For entry 3-28, the polymerization reaction includes the dual-chain catalyst, Catalyst 1, and single-chain catalyst, Catalyst 3. For entry 3-29, the polymerization reaction includes the dual-chain catalyst, Catalyst 1, and single-chain catalyst, Catalyst 4.

TABLE 11

Batch reactor conditions for polymerization with Catalyst 1, Catalyst 3, and Catalyst 4.

| Entry | Cat 1 μmol | Cat 3 μmol | Cat 4 μmol | Activator μmol | Hydrogen Δ psi | Ethylene g | Octene g | Isopar E g | Temp ° C. | diene g |
|---|---|---|---|---|---|---|---|---|---|---|
| 3-28 | 0.3 | 0.05 | 0 | 0.42 | 13 | 25 | 34 | 570 | 150 | 0.3 |
| 3-29 | 0.3 | 0 | 0.1 | 0.48 | 210 | 20 | 20 | 580 | 160 | 0.4 |

Activator: methyldi($C_{18}H_{37}$)ammonium tetrakis(pentafluorophenyl)borate, 10 μmol MMAO-3A, Diene: pentadiene

TABLE 12

Molecular weight and octene incorporation data for samples in Table 11.

| | | Conventional GPC | | Absolute GPC | | | | |
|---|---|---|---|---|---|---|---|---|
| Entry | Yield G | Mn g/mol | Mw g/mol | Mn g/mol | Mw g/mol | mol % Octene | $A_{TAIL}$ | Average g' |
| 3-28 | 38.1 | 22,225 | 108,226 | 20,861 | 133,499 | 2.0 | 0.175 | 0.919 |
| 3-29 | 18.8 | 30,193 | 73,229 | 29,896 | 82,083 | 2.9 | 0.113 | 0.868 |

TABLE 13

Ladder character and Mark-Houwink slopes for samples in Table 11.

| Entry | Ladder Character | | | | Mark-Houwink slopes | | | % wt fraction of high MW fraction |
|---|---|---|---|---|---|---|---|---|
| | Low MW Min | Low MW max | of high MW component | High MW Max | Low MW | High MW | Difference | |
| 3-28 | 0.011 | 0.198 | 5.01 | 1.065 | 0.72 | 0.62 | 0.10 | 19 |
| 3-29 | −0.070 | 0.142 | 5.10 | 1.083 | 0.70 | 0.68 | 0.02 | 8 |

TABLE 14

Shear and extensional rheology for samples in Table 11.

| Entry | $V_{0.1}$ Pa s | $V_1$ Pa s | $V_{100}$ Pa s | Rheology Ratio (RR) | MI g/10 min | MS cN | Ext mm/s | Average g' |
|---|---|---|---|---|---|---|---|---|
| 3-28 | 14,460 | 3,662 | 572 | 25.3 | 0.9 | 65 | 40 | 0.919 |
| 3-29 | 5,101 | 2,198 | 661 | 7.7 | 2.2 | 33 | 100 | 0.868 |

Figure 14:
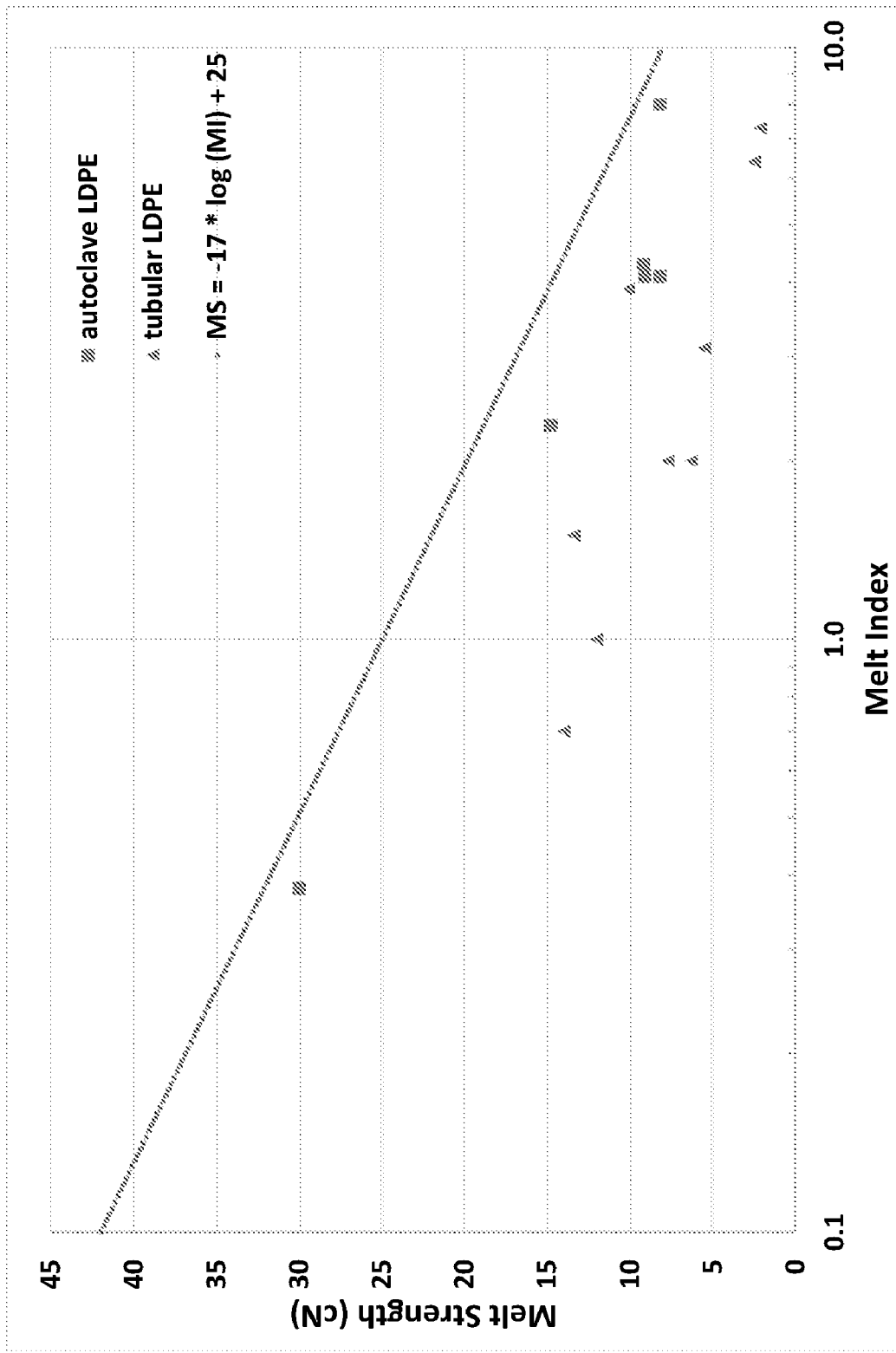
FIG. 14 is a plot of melt strength versus melt index (MI) for autoclave and tubular LDPEs.

MI estimated from viscosities: $MI=10^{\{4.7435-0.88267*Log(V_{0.1})-0.40245*Log(V_{100})\}}$ FIG. 14 depicts a plot of MS vs. MI for 15 autoclave and tubular LDPE resins (DOW™ LDPE PG7004, DOW™ LDPE 770G, DOW™ LDPE 6621, DOW™ LDPE 310E, DOW™ LDPE 410E, DOW™ LDPE 450E, DOW™ LDPE 751A, DOW™ LDPE 421E, DOW™ LDPE 7481, DOW™ LDPE 50041, DOW™ LDPE 4005, DOW™ LDPE 722, AGILITY™ EC 7220, AGILITY™ EC 7000, DOW™ LDPE 320E). In general, these follow a pattern where lower MI values lead to higher melt strength values. The melt strength is capped at 30 cN. LDPEs fall below the line drawn on the curve.

Figure 15:
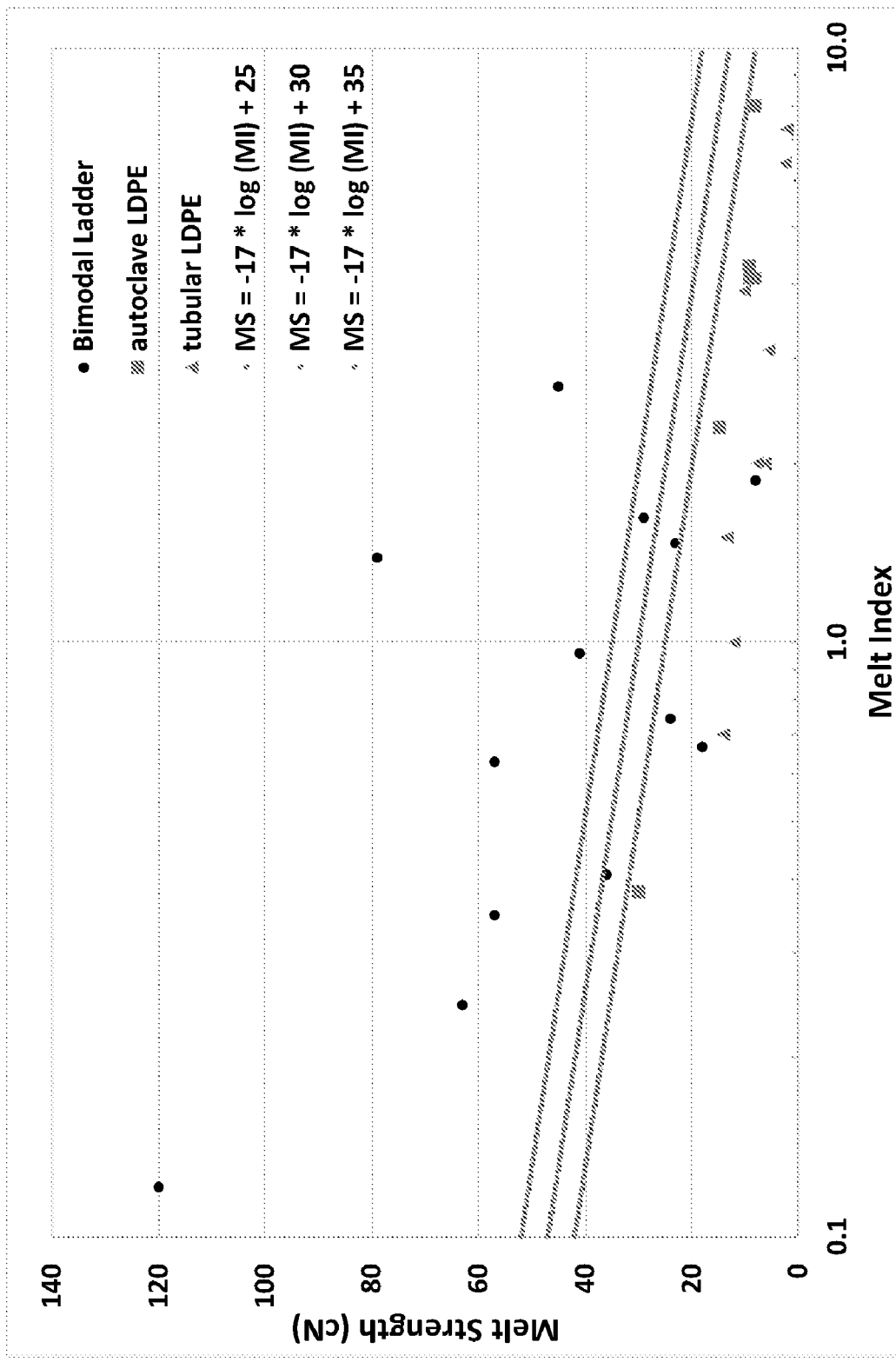
FIG. 15 is a plot of melt strength versus melt index (MI) for tetra-functional long-chain branched polymers and comparative LDPE resins.

FIG. 15 depicts a plot of MS vs. MI for the Ladder polymers, as well as the LDPE resins. The bimodal Ladder technology can achieve MI/MS relationships, which are above the LDPE limit (line).

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. An ethylene-based polymer comprising polymerized units derived from ethylene, diene, and one or more $C_3$-$C_{12}$ α-olefins, wherein the ethylene-based polymer comprises:
a melt viscosity ratio ($V_{0.1}/V_{100}$) at 190° C. greater than 20, where $V_{0.1}$ is viscosity of the ethylene-based polymer at 190° C. at a frequency of 0.1 radians/second, and $V_{100}$ is viscosity of the ethylene-based polymer at 190° C. at a frequency of 100 radians/second; and
an average g' greater than 0.860, where the average g' is an intrinsic viscosity ratio determined by gel permeation chromatography using a triple detector.

2. An ethylene-based polymer comprising polymerized units derived from ethylene, diene, and optionally one or more $C_3$-$C_{12}$ α-olefins, wherein the ethylene-based polymer comprises:
a melt strength greater than 10 cN (190° C., 2.4 mm/s$^2$, 120 mm from die exit to center of wheels, extrusion rate of 38.2 s$^{-1}$, capillary die of 30 mm length, 2 mm diameter and 180° entrance angle); and
an average g' greater than 0.860, where the average g' is an intrinsic viscosity ratio determined by gel permeation chromatography using a triple detector.

3. The ethylene-based polymer of claim 1, wherein the ethylene-based polymer has a melt strength of greater than 10 cN (190° C., 2.4 mm/s$^2$, 120 mm from the die exit to the center of the wheels, extrusion rate of 38.2 s$^{-1}$, capillary die of 30 mm length, 2 mm diameter and 180° entrance angle).

4. The ethylene-based polymer of claim 2, wherein the ethylene-based polymer has a melt viscosity ratio ($V_{0.1}/V_{100}$) at 190° C. is greater than 20, where $V_{0.1}$ is viscosity of the ethylene-based polymer at 190° C. at a frequency of 0.1 radians/second, and $V_{100}$ is viscosity of the ethylene-based polymer at 190° C. at a frequency of 100 radians/second.

5. The ethylene-based polymer of claim 1, wherein the diene is unconjugated and acyclic.

6. The ethylene-based polymer of claim 5, wherein the diene is selected from the group consisting of 1,4-pentadiene, 1,5-hexadiene, 1,6-heptadiene, 1,7-octadiene, 1,8-nonadiene, 1,9-decadiene, 1,10-undecadiene, 1,11-dodecadiene, dimethyldivinylsilane, dimethyldiallylsilane, and dimethylallylvinylsilane.

7. The ethylene-based polymer of claim 1, wherein the ethylene-based polymer comprises a low molecular weight polymer fraction and a high molecular weight polymer fraction, wherein the low molecular weight polymer fraction and the high molecular weight polymer fraction each comprise polymerized units derived from ethylene, diene, and one or more $C_3$-$C_{12}$ α-olefins.

8. The ethylene-based polymer of claim 7, wherein the second molecular weight polymer fraction comprises 0.5 to 30% by weight of the polymer.

9. The ethylene-based polymer of claim 8, wherein the second molecular weight polymer fraction comprises between 1 and 15% by weight of the polymer.

10. The ethylene-based polymer of claim 1, wherein the ethylene-based polymer has a MI greater than 0.1, wherein MI is melt index in g/10 min according to ASTM D1238.

11. The ethylene-based polymer of claim 10, wherein the MI is greater than 1.

12. The ethylene-based polymer of claim 2, wherein the ethylene-based polymer has a MI greater than 1.

13. The ethylene-based polymer of claim 1, wherein the average g' is greater than 0.88.

14. The ethylene-based polymer of claim 13, wherein the average g' is greater than 0.90.

15. The ethylene-based polymer of claim 3, wherein the melt strength is greater than 20 cN (190° C., 2.4 mm/s$^2$, 120 mm from die exit to center of wheels, extrusion rate of 38.2 s$^{-1}$, capillary die of 30 mm length, 2 mm diameter and 180° entrance angle).

16. The ethylene-based polymer of claim 2, wherein the melt strength is greater than 30 cN (190° C., 2.4 mm/s$^2$, 120 mm from die exit to center of wheels, extrusion rate of 38.2 s$^{-1}$, capillary die of 30 mm length, 2 mm diameter and 180° entrance angle).

17. The ethylene-based polymer of claim 4, wherein the melt viscosity ratio ($V_{0.1}/V_{100}$) at 190° C. is greater than 25, where $V_{0.1}$ is viscosity of the ethylene-based polymer at 190° C. at a frequency of 0.1 radians/second, and $V_{100}$ is viscosity of the ethylene-based polymer at 190° C. at a frequency of 100 radians/second.

18. The ethylene-based polymer of claim 13, wherein the melt viscosity ratio ($V_{0.1}/V_{100}$) at 190° C. is greater than 30, where $V_{0.1}$ is viscosity of the ethylene-based polymer at 190° C. at a frequency of 0.1 radians/second, and $V_{100}$ is viscosity of the ethylene-based polymer at 190° C. at a frequency of 100 radians/second.

19. The ethylene-based polymer of claim 1, wherein the ethylene-based polymer has a weight averaged molecular weight ($M_w$) of less than or equal to 250,000 Daltons, as determined by absolute gel permeation chromatography.

\* \* \* \* \*